United States Patent
Nath et al.

(10) Patent No.: US 10,400,915 B2
(45) Date of Patent: Sep. 3, 2019

(54) MAGNETICALLY CONTROLLED VALVE AND PUMP DEVICES AND METHODS OF USING THE SAME

(71) Applicant: Los Alamos National Security, LLC, Los Alamos, NM (US)

(72) Inventors: Pulak Nath, Los Alamos, NM (US); Jen-Huang Huang, Los Alamos, NM (US)

(73) Assignee: Triad National Security, LLC, Los Alamos, NM (US)

(*) Notice: Subject to any disclaimer, the term of this patent is extended or adjusted under 35 U.S.C. 154(b) by 84 days.

(21) Appl. No.: 15/488,119

(22) Filed: Apr. 14, 2017

(65) Prior Publication Data

US 2017/0298966 A1 Oct. 19, 2017

Related U.S. Application Data

(60) Provisional application No. 62/322,622, filed on Apr. 14, 2016.

(51) Int. Cl.
| | | |
|---|---|---|
| *F15C 3/04* | (2006.01) | |
| *F16K 99/00* | (2006.01) | |
| *F04C 2/14* | (2006.01) | |
| *F04C 15/06* | (2006.01) | |
| *F04C 18/14* | (2006.01) | |
| *F04C 29/12* | (2006.01) | |
| *B01L 3/00* | (2006.01) | |
| *F04D 15/00* | (2006.01) | |
| *F04D 27/00* | (2006.01) | |

(Continued)

(52) U.S. Cl.
CPC ............ *F16K 99/0046* (2013.01); *B01L 3/00* (2013.01); *F04C 2/14* (2013.01); *F04C 15/064* (2013.01); *F04C 18/14* (2013.01); *F04C 29/124* (2013.01); *F04D 15/0005* (2013.01); *F04D 27/003* (2013.01); *F04D 27/005* (2013.01); *F04C 2/18* (2013.01); *F04C 14/24* (2013.01); *F16K 2099/0094* (2013.01)

(58) Field of Classification Search
CPC .......... F16K 99/0046; B01L 3/00; F04C 2/14; F04C 15/064; F04C 18/14; F04C 29/124; F04D 15/0005; F04D 27/003; F04D 27/005
USPC ........ 137/827, 829, 832, 806, 809; 335/207, 335/177, 302, 306
See application file for complete search history.

(56) References Cited

U.S. PATENT DOCUMENTS 5,085,562 A * 2/1992 van Lintel ............ F04B 43/046 417/412
5,876,187 A * 3/1999 Forster .................. F04B 43/046 137/814

(Continued)

OTHER PUBLICATIONS

Au et al., "Microvalves and Micropumps for BioMEMS," *Micromachines*; 2:179-220 (May 24, 2011).

(Continued)

*Primary Examiner* — Minh Q Le
(74) *Attorney, Agent, or Firm* — Klarquist Sparkman, LLP

(57) ABSTRACT

Disclosed herein are embodiments of magnetically controlled valve and pump systems that can be used to control and facilitate fluid flow in fluidic devices. Various types of magnetically controlled valves and pumps are described as well as methods of magnetically-controlling such valves and pumps.

14 Claims, 13 Drawing Sheets

(51) Int. Cl.
*F04C 2/18* (2006.01)
*F04C 14/24* (2006.01)

(56) References Cited

U.S. PATENT DOCUMENTS

| | | | | |
|---|---|---|---|---|
| 5,932,799 | A * | 8/1999 | Moles | B01L 3/502707 73/53.01 |
| 6,106,245 | A * | 8/2000 | Cabuz | F04B 43/0063 417/322 |
| 6,234,079 | B1 * | 5/2001 | Chertkow | B41C 1/00 101/395 |
| 6,520,753 | B1 * | 2/2003 | Grosjean | F04B 19/24 417/379 |
| 6,581,899 | B2 * | 6/2003 | Williams | B01F 5/0646 251/7 |
| 6,729,856 | B2 * | 5/2004 | Cabuz | F04B 43/025 417/322 |
| 8,007,704 | B2 * | 8/2011 | Smith | B29C 45/14811 264/272.11 |
| 8,973,613 | B2 * | 3/2015 | Murphy | F15B 21/065 137/827 |
| 9,389,231 | B2 * | 7/2016 | Edwards | G01N 33/56911 |
| 9,644,623 | B2 * | 5/2017 | Mathies | B01F 5/10 |
| 2006/0076068 | A1 * | 4/2006 | Young | B01F 5/0683 137/829 |
| 2008/0163946 | A1 * | 7/2008 | Gomez | F16K 99/0001 137/843 |
| 2008/0271799 | A1 * | 11/2008 | Wimberger-Friedl | B01L 3/502738 137/831 |
| 2010/0139797 | A1 * | 6/2010 | Delamarche | B01F 5/0611 137/806 |
| 2012/0141316 | A1 * | 6/2012 | Wakefield | F04C 2/084 418/206.1 |
| 2013/0206264 | A1 * | 8/2013 | Rodenfels | B01L 3/5027 137/832 |

OTHER PUBLICATIONS

Hulme et al., "Incorporation of prefabricated screw, pneumatic, and solenoid valves into microfluidic devices," *Lab Chip*; 9(1):79-86 (Jan. 7, 2009).

Shen et al., "Magnetic active-valve micropump actuated by a rotating magnetic assembly," *Sensors and Actuators B: Chemical*; 154:52-58 (Oct. 20, 2009).

Wei et al., "An On-Board Microfluidic Pump Driven by Magnetic Stir Bar," *18th International Conference on Miniaturized Systems for Chemistry and Life Sciences, MicroTAS*; 2211-2213 (Jan. 2014).

* cited by examiner

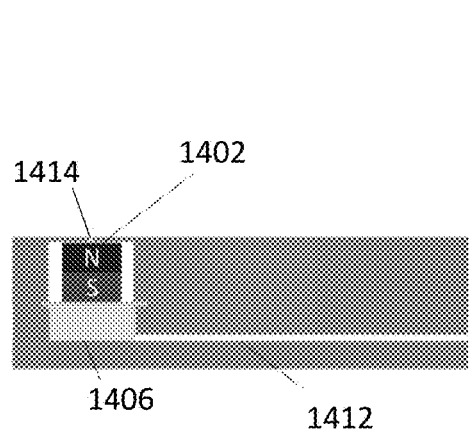
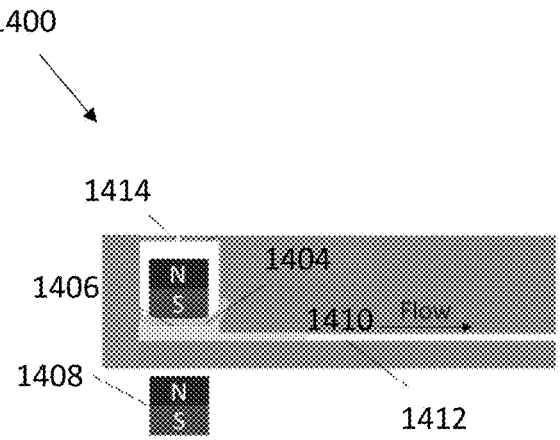
FIG. 14A FIG. 14B
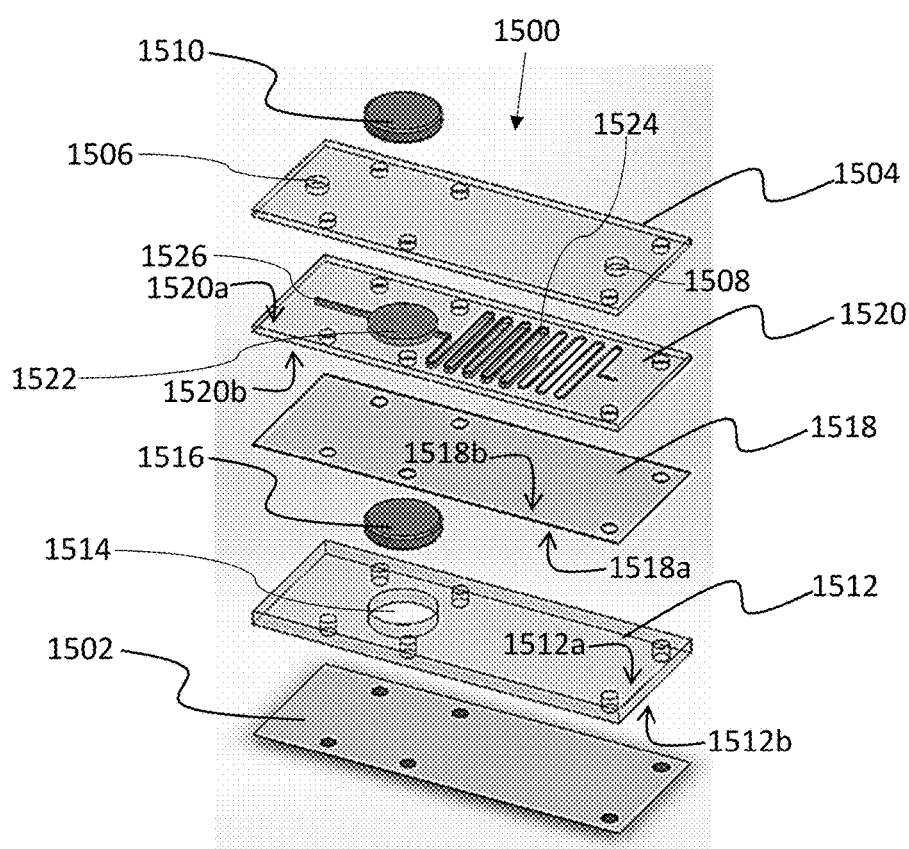
FIG. 15

MAGNETICALLY CONTROLLED VALVE AND PUMP DEVICES AND METHODS OF USING THE SAME

CROSS REFERENCE TO RELATED APPLICATION

This application claims the benefit of U.S. Provisional Application No. 62/322,622, filed Apr. 14, 2016, which is incorporated herein by reference in its entirety.

ACKNOWLEDGMENT OF GOVERNMENT SUPPORT

This invention was made with government support under Contract No. DE-AC52-06NA25396 awarded by the U.S. Department of Energy and grant number CMBXCEL-XLI-2-0001 awarded by the Defense Threat Reduction Agency (DTRA). The government has certain rights in the invention.

FIELD

The present disclosure concerns embodiments of magnetically controlled pumps, valves, and other components capable of controlling fluid flow in fluidic devices.

BACKGROUND

Managing systems and/or reactors that require fluid delivery for operation can be complex and difficult, given, for example, the wide variety of components used in reactor set-ups, the number of inlets and outlets required for fluid delivery, and the different types of fluids that can be involved. Conventional manifolds or other conventional means for controlling fluid flow often require complex tubing configurations to facilitate and control fluid delivery to and from a reactor. Such complex set-ups are not user-friendly and often require a multitude of expensive components that have an increased margin of error during use. Additionally, conventional systems require multiple pumps and complex valve systems to operate and facilitate flow through fluidic devices.

Power requirements (e.g. electromagnetic valves), low back-pressure rating (e.g. piezo driven valves), small head pressures (e.g. piezo driven pumps), the need for peripherals (e.g. pneumatic valves), the lack of automation (e.g. screw valves) and manufacturing difficulties (e.g. soft lithography) limit wide-spread applications of many valves/pumps used in the art for fluid delivery. There exists a need in the art for devices and systems capable of reducing the complexity of fluid delivery mechanisms and the cost associated with such mechanisms.

SUMMARY

Disclosed herein are embodiments of devices and components that can serve as pumps and valves and that are controlled using magnetism. In some embodiments, the devices comprise chip components fabricated to comprise a magnet substrate comprising a well configured to house the actuating magnet and comprising a first surface and a second surface, and a fluid channel substrate with a first surface and a second surface wherein the first surface of the fluid channel is coupled directly or indirectly to the first surface of the magnet substrate, wherein the fluid channel substrate comprises a fluidic channel, a well fluidly coupled to the fluidic channel, or a combination thereof. The chips can be modified with one or more actuating magnets to provide a valve device and/or a pump device. In some embodiments, the chips further comprise a flexible membrane component positioned between the first surface of the magnet substrate and the first surface of the fluid channel substrate. In some embodiments, the devices disclosed herein comprise a plurality of actuating magnets housed in a plurality of wells fabricated in the magnet substrate.

In some embodiments, the device is a pump device, which can comprise a magnet substrate comprising a well configured to house an actuating magnet and comprising a first surface and a second surface; a flexible membrane component comprising a first surface and a second surface, wherein the first surface of the flexible membrane component is positioned adjacent to the first surface of the magnet substrate; and a well-containing substrate with a first surface and a second surface wherein the first surface of the well-containing substrate is coupled to the second surface of the flexible membrane component, the well-containing substrate comprising a well aligned with the well of the magnet substrate. Actuating magnets are housed within the magnet substrate and can be controlled using driver magnets.

In additional embodiments, the device can be a valve device, which comprises a magnet substrate comprising a well configured to house an actuating magnet and comprising a first surface and a second surface; a barrier layer comprising a first surface and a second surface wherein the first surface of the barrier layer is positioned adjacent to the first surface of the magnet substrate; and a fluid channel substrate with a first surface and a second surface wherein the first surface of the fluid channel substrate is coupled to the second surface of the barrier layer, the fluid channel substrate comprising a discontinuous fluidic channel comprising an elevation configured block fluid flow through the discontinuous fluid channel.

Also disclosed herein are embodiments of integrated pump and valve devices, which comprise a pump component as described herein that is fluidly coupled via an outlet to an inlet of a valve component as described herein.

Also disclosed herein are embodiments of methods for magnetically controlling fluid flow through a fluidic channel, comprising using a driver magnet or a driver magnet component to magnetically attract or magnetically repel the actuating magnet of the devices described herein.

The foregoing and other objects, features, and advantages of the present disclosure will become more apparent from the following detailed description, which proceeds with reference to the accompanying figures.

BRIEF DESCRIPTION OF THE DRAWINGS

FIG. 1A shows the valve open ("Valve ON");

FIG. 1B shows the valve closed ("Valve OFF").

FIG. 4A shows the valve when closed and FIG. 4B shows the valve when open.

FIG. 5A shows the valve when closed and FIG. 5B shows the valve when open.

FIG. 10A is an exploded perspective view of the representative planar centrifugal pump, and FIG. 10B is a perspective view of the constructed representative planar centrifugal pump.

FIGS. 12A and 12B are illustrations of a representative planar rotary gear pump embodiment described herein, wherein FIG. 12A is an exploded perspective view of the representative planar rotary gear pump embodiment, and FIG. 12B is a perspective view of the representative constructed planar rotary gear pump embodiment.

FIGS. 14A and 14B are schematic illustrations showing the operation of a representative infusion pump; FIG. 14A shows the infusion pump in a resting state and FIG. 14B shows the pump as it pumps fluid out of a reservoir and into a fluidic channel.

FIG. 15 is an exploded perspective view of a representative infusion pump device.

FIG. 19A shows the vacuum pump in a resting state and FIG. 14B shows the vacuum pump as it pulls a vacuum due to interaction between a driver magnet and an actuating magnet, which exerts force on a flexible membrane component.

DETAILED DESCRIPTION

I. Explanation of Terms

Figure 1:
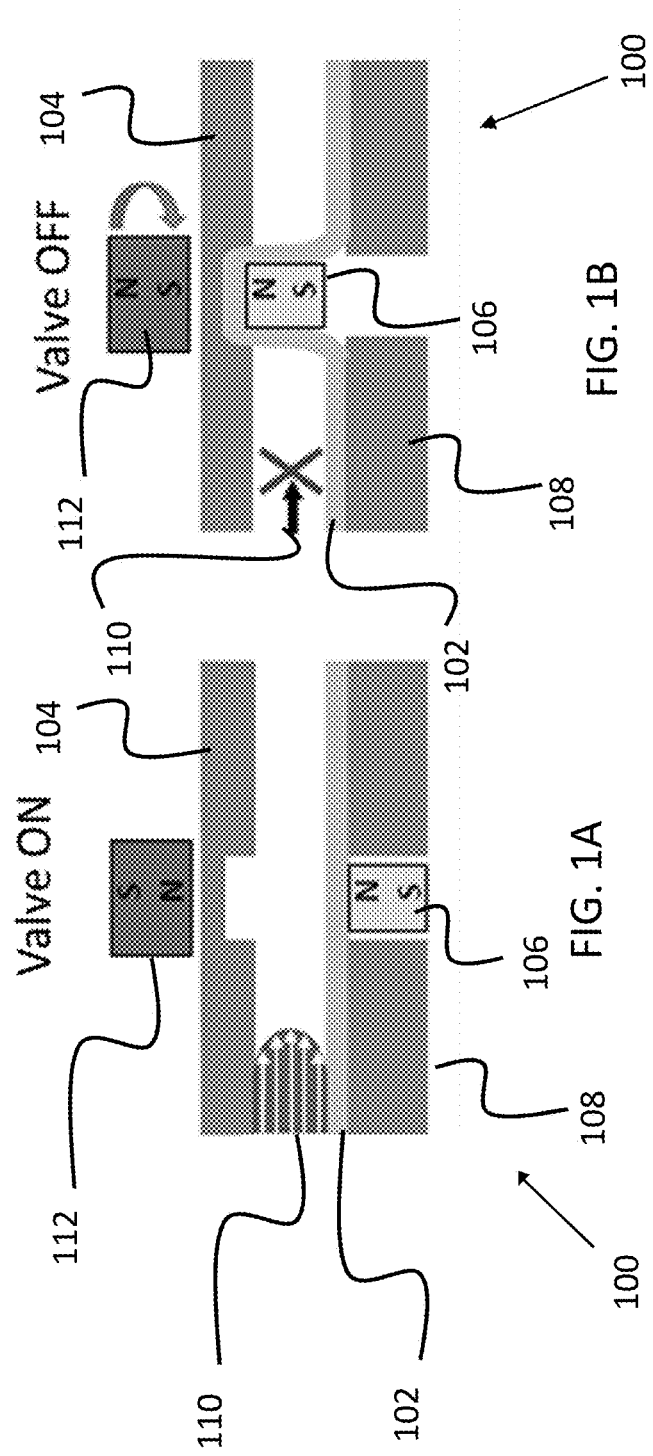
FIGS. 1A and 1B are a schematic illustrations of a magnetically controlled "normally open" valve that utilizes permanent magnets and a flexible membrane to control flow through a fluidic channel.

The following explanations of terms are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Any theories of operation are to facilitate explanation, but the disclosed devices, materials, and methods are not limited to such theories of operation. Although the operations of some of the disclosed methods are described in a particular, sequential order for convenient presentation, it will be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed components and materials can be used in conjunction with other components and materials. Additionally, the description sometimes uses terms such as "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or devices are referred to as "lowest," "best," "minimum," or the like. It will be appreciated that such descriptions are intended to indicate that a selection among many used functional alternatives can be made, and such selections need not be better, smaller, or otherwise preferable to other selections.

Examples are described with reference to directions indicated as "above," "below," "upper," "lower," and the like. These terms are used for convenient description, but do not imply any particular spatial orientation.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting, unless otherwise indicated. Other features of the disclosure are apparent from the following detailed description and the claims. Furthermore, not all alternatives recited herein are equivalents.

To facilitate review of the various embodiments of the disclosure, the following explanations of specific terms are provided:

Actuating Magnet: A permanent magnet or magnetic material used to control (e.g., to stop or permit) fluid flow through a fluidic channel, to pump fluid through a fluidic channel, or to promote a change in pressure so as to create a vacuum. In some embodiments, actuating magnets are used to physically move a flexible membrane within a fluidic channel or a well. In some embodiments, actuating magnets are used as physical blockades to fluid flow in a fluidic channel, such as when a flexible membrane component is not used in combination with the actuating magnet. Actuating magnets that act as valves to permit or block fluid flow within a fluidic channel are referred to as "valve actuating magnets." Actuating magnets that serve to pump fluid through fluidic channels are referred to as "pump actuating magnets."

Adjacent: As used herein, this term can refer to embodiments where two device components are in physical contact with one another (that is, touching one another).

Coupled: As used herein, this term can include embodiments wherein two device components are adjacent to one another (that is, touching) or wherein two device components are joined by one or more intervening components. For example, a fluid channel substrate can be coupled to a magnet substrate such that it is touching the magnet substrate or such that it is joined to the magnet substrate through another device component, such as a flexible membrane component.

Discontinuous Channel: A fluidic channel comprising one or more elevations that substantially occupy the space of the fluidic channel, or a fluidic channel comprising one or more sections that are configured to allow an actuating magnet to pass through the fluidic channel such that the actuating magnet interrupts the continuity of the fluidic channel (that is, stops fluid flow through the channel). For example, in some embodiments wherein an actuating magnet is used to interrupt the continuity of the fluidic channel, the fluidic channel can have smaller dimensions (e.g., smaller channel width) than that of the section that is configured to allow the actuating magnet to pass through the fluidic channel (for an example, see the two branched fluidic channels of component 208 illustrated in FIG. 3).

Driver Magnet: A permanent magnet or magnetic material used to actuate (e.g., move) an actuating magnet by either magnetically repelling or magnetically attracting an actuating magnet. Driver magnets that interact with valve actuating magnets so as to permit or block fluid flow within a fluidic channel are referred to as "valve driver magnets." Driver magnets that interact with pump actuating magnets to pump fluid through fluidic channels are referred to as "pump driver magnets."

Fluid: This term refers to liquids, gases, and/or air.

Fluid Channel Substrate: A substrate that is fabricated to comprise either at least one fluidic channel through which fluid can flow or at least one reservoir or well in which fluid (including liquids, air, or gas) can be contained.

Fluidic Channel: A fabricated pathway embedded in a substrate through which fluid can flow. In some embodiments, the fluidic channels can be microchannels or nanochannels. The term "microchannels," as used herein, is understood to refer to channels having dimensions less than 1 mm and greater than or equal to 1 µm. The term "nanochannels," as used herein, is understood to refer to channels having dimensions less than 1 µm and greater than or equal to 1 nm. In yet other embodiments, the channels can have dimensions less than 10 mm and greater than or equal to 1 mm.

Gear Component: A substrate comprising one or more cogs.

Magnet: An object or composition that produces its own persistent magnetic field even in the absence of an applied magnetic field. Magnets described herein can comprise ferromagnetic materials or paramagnetic materials and can have any shape, such as disc-shaped, rectangular, square, ellipsoidal, spherical, or the like. A magnet has a north pole and a south pole and typically, the magnetic field lines of magnet will emerge from the magnet's north pole and re-enter at the south pole. A "permanent" magnet (in contrast to an "electromagnet") is an object made from a material that is magnetized and creates its own persistent magnetic field.

Magnet substrate: A substrate that is fabricated to comprise one or more wells or openings into which one or more actuating magnets can be placed/held.

Spacer Substrate: A substrate that is used to increase the distance between a magnet substrate and a driver magnet or a driver magnet component.

Well-Containing Substrate: A substrate that comprises a well that can contain fluid, such as a liquid or gas (e.g., such as when used with a valve or fluid pump, such as a peristaltic or infusion pump as described herein), or that can be empty such that it provides a void space (e.g., such as when used in a vacuum pump embodiment described herein). In some embodiments, a well-containing substrate can further comprise a fluidic channel fluidly coupled to the well. In some embodiments, well-containing substrates are used with vacuum pump embodiments and/or infusion pump embodiments described herein.

II. Components

Figure 21:
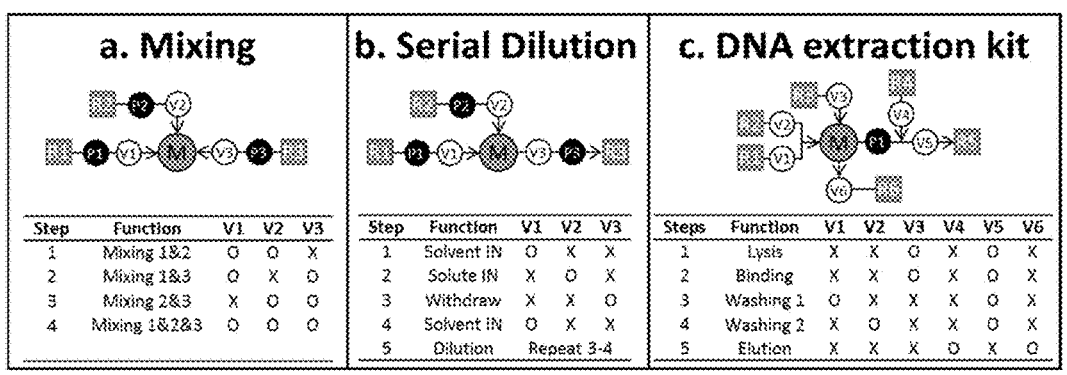
FIG. 21 shows exemplary flow diagrams and logic tables that can be automated using the devices and device components described herein.

Disclosed herein are embodiments of magnetically controlled pumps and valves for microfluidic applications. The fluidic valve- and pump-driver mechanics and devices described herein can be used to replace conventional valves and pumps, such as normally open or normally closed valves, solenoid valves, peristaltic pumps, vacuum pumps, centrifugal pumps, infusion pumps, gear pumps, and the like. In some embodiments, the magnetic control mechanisms and components described herein can be used to control a combination of valves and pumps. In such embodiments, the magnetically controlled pumps and valves can be used to execute a wide range of fluid logics (e.g., see FIG. 21), which facilitates execution of fluid processing, including automated fluid processing, for a wide range of applications (e.g., DNA sequencing, chemical analysis, titration, and other applications described herein). In particular embodiments, the devices and components disclosed herein can be used in combination with (1) bio-assessment devices, such as those described at least in part in WO 2016/049363 (incorporated herein by reference); (2) fluid management devices, such as those described at least in part in WO 2016/049365 (incorporated herein by reference); and (3) multi-media compositions, such as those described at least in part in WO 2016/049367 (incorporated herein by reference).

The pump and valve devices described herein comprise a chip (e.g., a fluidic chip) in combination with one or more actuating magnets. In some embodiments, the chip comprises at least one magnet substrate and another substrate, such as a fluidic channel substrate, a well-containing substrate, or a combination thereof. The magnet substrate and other substrates of the devices disclosed herein can be held together using an adhesive, they can be laminated together, or they can be held together using an external mechanism (e.g., clamps or the like) In particular disclosed embodiments, the devices described herein comprise a magnet substrate (e.g., substrate 1512 of FIG. 15) comprising a well (e.g., well 1514 of FIG. 15) configured to house an actuating magnet (e.g., magnet 1516 of FIG. 15) and comprising a first surface (e.g., surface 1512a of FIG. 3) and a second surface (e.g., surface 1512b of FIG. 3); a fluid channel substrate (e.g., substrate 1520 of FIG. 15) or a well-containing substrate with a first surface (e.g., surface 1520b of FIG. 15) and a second surface (e.g., surface 1520a of FIG. 3) wherein the first surface of the fluid channel substrate or the well-containing substrate is coupled directly or indirectly to the first surface of the magnet substrate, and wherein the fluid channel substrate comprises a fluidic channel (e.g., channel 1524 of FIG. 15), a well (e.g., reservoir 1522 of FIG. 15), or a combination thereof. In some embodiments, the device can further comprise a flexible membrane component (e.g., component 1518 of FIG. 15), which can comprise a first surface (e.g., surface 1518a of FIG. 15) and a second surface (e.g., surface 1518b of FIG. 15). Actuating magnets can be added to the pump and valve devices such that the actuating magnets are placed in wells of the magnet substrate. Various valve and pump device embodiments are described below.

A. Valve Embodiments

In some embodiments, the disclosed systems and devices utilize a magnetic effect to control operation of fluid flow through microfluidic channels by controlling whether a fluid channel is opened or closed, thus acting as a magnetically-controlled valve. In some embodiments, the devices are valve fluidic chips that comprise a magnet substrate coupled to a fluid channel substrate. In some embodiments, the valve fluidic chips can further comprise a flexible membrane or a barrier layer positioned between the magnet substrate and the fluid channel substrate. The magnet substrate of the valve fluidic chip can comprise a well configured to house a valve actuating magnet and can have a first surface and a second surface. The fluid channel substrate also has a first surface and a second surface and is fabricated to comprise one or more fluidic channels. In some embodiments, the fluidic channels of the fluid channel substrate can be discontinuous fluidic channels.

In some embodiments, the valve fluidic chips further comprise a flexible membrane component positioned between the magnet substrate and the fluid channel substrate such that a first surface of the membrane component is positioned adjacent to the first surface of the magnet substrate and the second surface of the membrane component is positioned adjacent to the first surface of the fluid channel substrate. The flexible membrane component serves as a valve by blocking or unblocking the path of a fluid through a fluidic channel. The flexible membrane component can comprise silicone, poly-urethane, fluorinated silicone, polyimide, fluorinated ethylene propylene (FEP), perfluoroalkoxy polymer resin (PFA), Teflon, or combinations thereof. In some embodiments, magnetic components, such as valve actuating magnets housed within the magnet substrate can be associated with the flexible membrane and, when aligned with another magnetic component, such as a driver magnet of a driver magnet component, can position the flexible membrane in an open or closed position within a fluidic channel. In some embodiments, the flexible membrane can be moved from an open position (whereby fluid is allowed to flow through a fluidic channel) to a closed position (whereby the fluid flow through a fluidic channel is stopped). Such embodiments are referred to herein as "normally open" (or "normally open valves"). In yet additional embodiments, the flexible membrane can be moved from a closed position within a discontinuous channel (whereby fluid is not allowed to flow through a fluidic channel) to an open position within the discontinuous channel (whereby fluid is allowed to flow through the space defined by the flexible membrane and the discontinuous channel). Such embodiments are referred to herein as "normally closed" (or "normally closed valves").

In "normally open" embodiments, the magnetically controlled valve can be controlled by positioning an actuating magnet adjacent to the flexible membrane and positioning a driver magnet opposite the actuating magnet with the flexible membrane being located between the actuating magnet and driver magnet. An exemplary embodiment 100 is illustrated in FIGS. 1A and 1B. As shown by FIGS. 1A and 1B, a flexible membrane 102 is positioned adjacent to a fluidic channel defined by a fluid channel substrate 104. An actuating magnet 106 is positioned within a depression (or well) of a magnet substrate 108. The well is defined by the magnet substrate 108 and is configured to house (or accept) the actuating magnet 106 and holds the actuating magnet in place and adjacent to the flexible membrane 102 such that fluid flow (illustrated by arrows 110) can occur through the fluidic channel. A driver magnet 112, which is separate from the actuating magnet, is then positioned along the wall of the fluid channel substrate 104 such that it is positioned opposite the actuating magnet 106. The flexible membrane 102 remains in an open position along the wall when the poles of the driver magnet 112 and the actuating magnet 106 are matched (e.g., north$_{Dm}$/north$_{Am}$ or south$_{Dm}$/south$_{Am}$, wherein Dm=driver magnet and Am=actuating magnet), but when the driver magnet 112 is flipped (FIG. 1B) or replaced with another driver magnet (not illustrated) having an opposite orientation, it no longer repels the actuating magnet 106 but instead attracts the actuating magnet 106. When the actuating magnet is attracted to the driver magnet, the flexible membrane is forced into a position that prevents flow (110) through the fluidic channel. As shown in FIG. 1A, the fluid substrate 104 can include a small indentation to accommodate the flexible membrane 102 when it is moved by the actuating magnet 106. In some embodiments, the driver magnet 112 can be part of a magnet driver component (not illustrated) that is separate from the valve device. Similar to magnet substrates that are configured to house the actuating magnets, the magnet driver component can comprise wells that house (or accept) the driver magnets.

Figure 2:
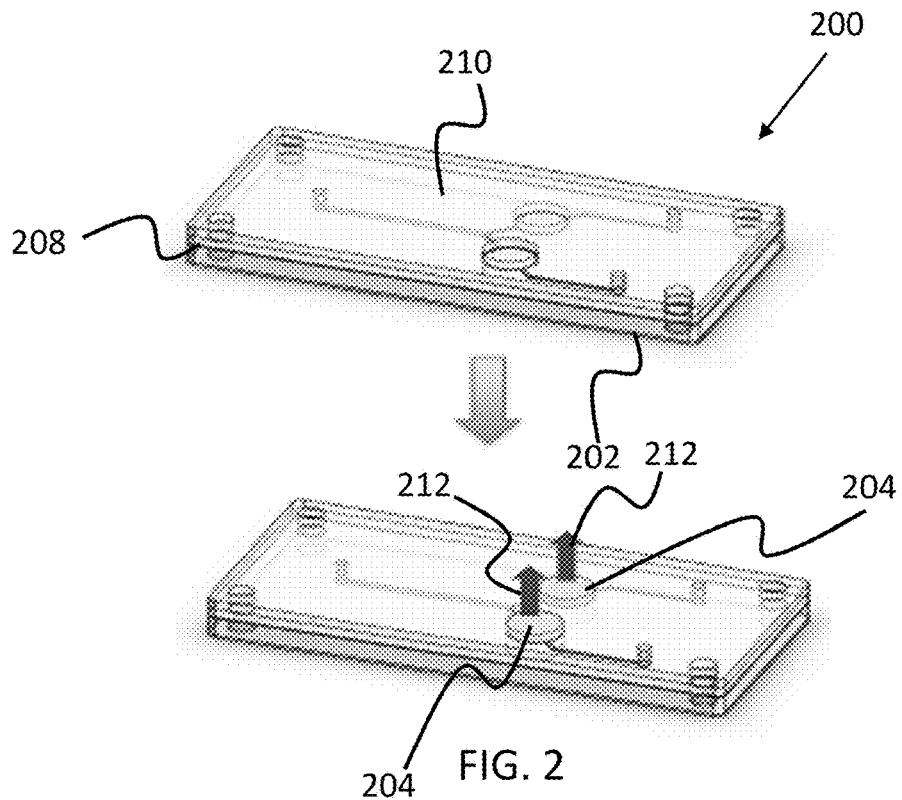
FIG. 2 is an illustration of an exemplary fluidic device comprising actuating magnets that are moved in an upward direction by driver magnets (not illustrated) to thereby close a discontinuous fluidic channel; two discontinuous channels (one magnet each) are illustrated.
Figure 3:
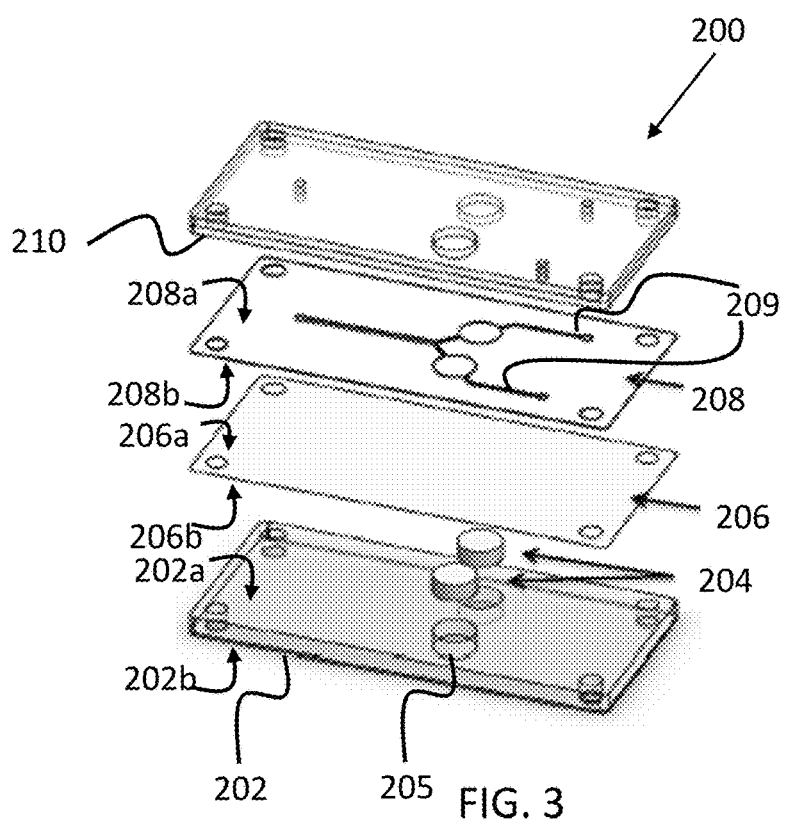
FIG. 3 is an exploded perspective view of the fluidic device illustrated in FIG. 2, and illustrates a magnet substrate housing two actuating magnets, a flexible membrane component, a fluid channel substrate comprising a fluidic channel system with two discontinuous fluidic channels, and an external substrate.

Device components can be constructed comprising a magnetically controlled normally open valve(s) fluidic chips comprising one or more actuating magnets. For example, FIGS. 2 and 3 illustrates a fluidic chip 200 having a magnet substrate 202 that houses actuating magnets 204 and allow the actuating magnets to force the flexible membrane component 206 (as illustrated in FIG. 3) into a closed position when a driver magnet (not illustrated) is positioned near the actuating magnets 204 (such as when it is indirectly coupled to fluid channel substrate 208 via external substrate 210) and opposite poles of the two magnets face each other (not illustrated). Fluid flow through the channels of the fluidic chip shown in FIG. 2 can thus be turned off when the actuating magnet is attracted to the driver magnet (this motion indicated by arrows 212 in FIG. 2). FIG. 3 provides an exploded perspective view of the valve fluidic chip 200 of FIG. 2. As illustrated in FIG. 2, the valve fluidic chip can comprise a plurality of substrates, such as magnet substrate 202 (which can comprise a first surface 202a and a second surface 202b), fluid channel substrate 208 (which comprises two discontinuous fluidic channels 209 and a first surface 208b and a second surface 208a), and/or external substrate 210. The valve fluidic chip also comprises a flexible membrane component 206 (which can comprise a first surface 206b and a second surface 206a), which can be positioned between the magnet substrate 202 and fluid channel substrate 208.

Figures 4A, 4B:
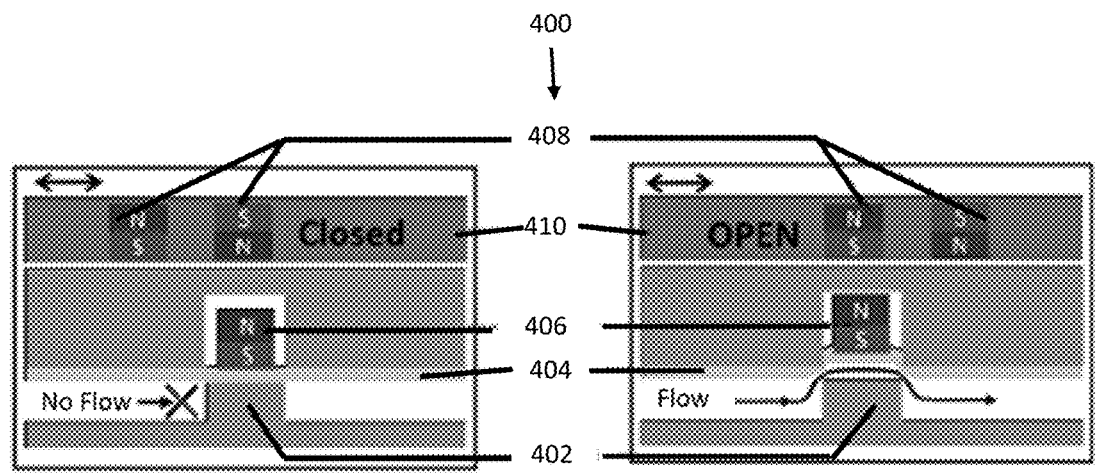
FIGS. 4A and 4B are schematic illustrations of a magnetically controlled "normally closed" valve, which comprises a fluid channel substrate with a discontinuous fluidic channel (402), a flexible membrane (404), an actuating magnet (406), and a driver magnet component (410) comprising two driver magnets (408)

In some embodiments, the valve devices can comprise one or more normally closed valves. In such embodiments, the device can comprise a flexible membrane, one or more actuating magnets, one or more driver magnets, and a valve driver component. An exemplary embodiment of how a normally closed valve device operates is shown in FIGS. 4A and 4B. As illustrated in FIG. 4A, the normally closed valve device comprises a fluidic chip having a fluidic channel that is normally closed such that flow does not occur through the fluidic channel when the valve is closed, or in its resting state. In some embodiments, the fluidic flow through the channel can be blocked by using a discontinuous fluidic channel. In a discontinuous fluidic channel, the channel is designed so that no flow occurs until the flexible membrane that is positioned within the channel is sufficiently lifted away from the channel so as to allow fluid to pass through. This type of flow control is illustrated in FIGS. 4A (which shows the valve normally closed) and 4B (which shows the valve when open). In some embodiments, a discontinuous fluidic channel can comprise one or more elevations 402 that substantially occupy the space of the fluidic channel. By lifting the flexible membrane 404 away from the one or more elevations of the discontinuous fluidic channels using the actuating magnets 406 and driver magnets 408 of a magnet driver component 410, a space is created so that fluid can flow over the elevation and through the fluidic channel (FIG. 4B).

Similar to other embodiments described herein, the actuating magnet(s) (e.g., magnets 406 of FIGS. 4A and 4B) can be contained within one or more wells that are positioned adjacent to the flexible membrane within the fluidic channel. In some embodiments, the flexible membrane (e.g., membrane component 404 of FIGS. 4A and 4B) can be secured to the actuating magnet using an adhesive. In normally closed valves, the valve is actuated by using the driver magnets (e.g., driver magnets 408 of FIGS. 4A and 4B) to control the actuating magnet. For example, two (or more) driver magnets can be used with the actuating magnet to facilitate opening and closing the valve. A first driver magnet is positioned near the actuating magnet, typically with at least a portion of the wall defining the fluidic channel being located between the first driver magnet and the valve actuating magnet. The first driver magnet is arranged so that its north (or south) pole faces the north (or south) pole of the valve actuating magnet. Thus, the two magnets repel one another and the valve remains closed in the resting state. The valve actuating magnet is then actuated by moving the valve driver component over the valve actuating magnet such that a second driver magnet is aligned and able to interact magnetically with the valve actuating magnet. Thus, the second driver magnet is positioned so that it has the opposite coupling with the valve actuating magnet as compared to the first driver magnet. For example, the south pole of the second driver magnet is positioned above the north pole of the valve actuating magnet. When this positioning is obtained, the valve actuating magnet is magnetically attracted to the second driver magnet and the valve actuating magnet can then pull the flexible membrane up so that fluid is allowed to flow through the discontinuous channel. In some embodiments, the valve driver component can be moved left to right (or vice versa) using a linear actuator to automatically align the driver magnet with the valve actuating magnet.

In some embodiments, the magnetically controlled valves described herein can be membrane-free; that is, they can be operated without use of a membrane component as described above. In such embodiments, the membrane component described above can be omitted such that the magnets themselves are used to control flow through a fluidic channel without having to manipulate a membrane associated with the magnet. These embodiments can be used to elongate the life of the valve as well as the ability to withstand high breakthrough pressures. In some embodiments, the membrane-less valves can be used in devices where pressures as high as 30 psi are placed on the valves without observing any breakthrough. In some membrane-less embodiments, the valves can remain functional for longer periods of time, regardless of the position of the valve magnet, due to the absence of membrane fatigue. In membrane-free embodiments, fluid flow is controlled using a valve actuating magnet (e.g., magnet 504 of FIG. 5A) in combination with a fluidic channel, typically a discontinuous fluidic channel. The valve actuating magnet is housed in a magnet substrate (e.g., substrate 509 of FIG. 5A) comprising a well configured to house the valve actuating magnet. The fluidic channel is present in a fluid channel substrate (e.g., substrate 511 of FIG. 5A), which is constructed such that the fluidic channel has one or more elevations that have dimensions that are narrower than the actuating magnet and the well that houses the actuating magnet. The elevations typically are part of the fluid channel substrate itself; that is, the elevations and the fluid channel substrate are a unitary component.

Figures 5A, 5B:
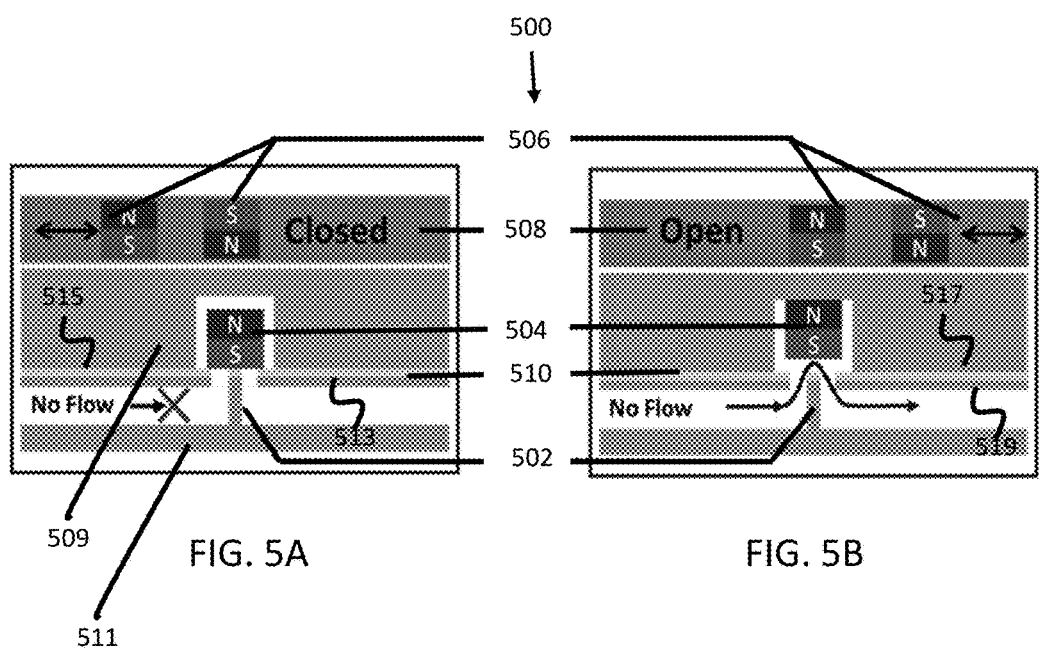
FIGS. 5A and 5B are schematic illustrations of a magnetically controlled "normally closed" valve, which is membrane-free and comprises a fluid channel substrate with a discontinuous fluidic channel (502), a barrier layer (510), an actuating magnet (504), and a driver magnet component (508) comprising two driver magnets (506)

For example, as illustrated by FIGS. 5A and 5B, elevation 502 has a narrower dimension than that of the valve actuating magnet 504 and the well area housing the magnet. Because elevation 502 is narrower, fluid flow can be diverted from the flow channel such that it passes over the elevation and back into the flow channel as illustrated in FIG. 5B. The valve actuating magnet controls flow by way of interacting with a driver magnet 506 housed within a magnet driver component 508, wherein the driver magnet is configured to lift the valve actuating magnet 504 away from the elevation 502 to allow fluid flow to diverge from the flow channel and into the well area housing the valve actuating magnet and then back into the flow channel on an opposite side of the elevation. In some embodiments, a barrier layer 510 is used to help form a seal between the magnet substrate, the valve actuating magnet, the elevation, and/or a portion of the fluid channel of the fluid substrate. The barrier layer can comprise silicone, poly-urethane, fluorinated silicone, polyimide, fluorinated ethylene propylene (FEP), perfluoroalkoxy polymer resin (PFA), Teflon, or combinations thereof. The barrier layer (e.g., layer 510 of FIG. 5A) comprises a first surface (e.g., surface 515 of FIG. 5A), which in some embodiments can be positioned adjacent to the first surface (e.g., surface 517 of FIG. 5B) of a magnet substrate (e.g., substrate 509 of FIG. 5A); and the barrier layer also can comprise a second surface (e.g., surface 513 of FIG. 5A), which in some embodiments can be positioned adjacent to a first surface (e.g., surface 519 of FIG. 5B) of a fluid channel substrate (e.g., substrate 511 of FIG. 5A). The barrier layer can have any thickness, such as 0.01 mm to 1 mm, such as 0.05 mm to 1 mm, or 0.1 mm to 1 mm, or 0.5 mm to 1 mm. In some embodiments, the valve actuating magnet can comprise a coating (such as epoxy, Teflon, polyimide, silicone, or combinations thereof) that prevents fluid from the fluidic channel from interacting with or touching the magnetic material of making up the valve magnet.

By lifting the valve actuating magnet away from the one or more elevations of the discontinuous fluidic channel using the driver magnet, a space is created so that fluid can flow over the elevation and through the fluidic channel. In normally closed valves, the valve is actuated by using a driver magnet to control the valve actuating magnet. For example, two (or more) driver magnets can be used with the actuating magnet to facilitate opening and closing the valve. The driver magnets can be positioned adjacent to the magnet substrate, the fluid channel substrate, or both. A first driver magnet is positioned so that it is aligned with the valve actuating magnet. The first driver magnet is arranged so that its north (or south) pole faces the north (or south) pole of the valve actuating magnet. Thus, the two magnets repel one another and the valve remains closed in the resting state (e.g., see FIG. 5A). The valve actuating magnet is then actuated by aligning a second driver magnet (such as by moving or rotating a driver magnet component) with the valve actuating magnet. The second driver magnet can then interact magnetically with the valve actuating magnet. Thus, the driver magnet is positioned so that it has the opposite coupling with the valve actuating magnet as compared to the first driver magnet (e.g., see FIG. 5B). For example, the south pole of the second driver magnet is positioned above the north pole of the valve actuating magnet. When this positioning is obtained, the valve actuating magnet is magnetically attracted to the second driver magnet and is lifted away from the elevation portion of the discontinuous channel so that fluid is allowed to flow through the discontinuous channel (FIG. 5B). In some embodiments, the driver magnet component can comprise a linear driver magnet array that can be moved left to right (or vice versa) to automatically align driver magnets with the valve actuating magnet. In some additional embodiments, the driver magnet component can comprise a circular array of driver magnets that can be rotated in a circle motion to automatically align driver magnets with the valve actuating magnet.

In some embodiments, the magnetically controlled valves described herein can be used in combination with fluid management devices, such as those described in WO 2016/049365, which is incorporated herein by reference. In such embodiments, the fluid management device can be coupled to a magnetically controlled valve device, which comprises one or more actuating magnets, a valve driver component, and a flexible membrane component. The magnetically controlled valve device is used to control fluid flow through fluidic channels within the fluid management device. Such embodiments can utilize one or more normally open valves and/or one or more normally closed valves. The magnetically controlled valve device also comprises a driver magnet component, which includes a valve driver component and one or more driver magnets. In particular disclosed embodiments, the driver magnets are configured in a pre-determined pattern so as to provide various valve operation modes. In some embodiments, the pre-determined pattern of the driver magnets can be provided on a valve driver component comprising a linear configuration of the driver magnets or a circular/continuous configuration.

Figure 6:
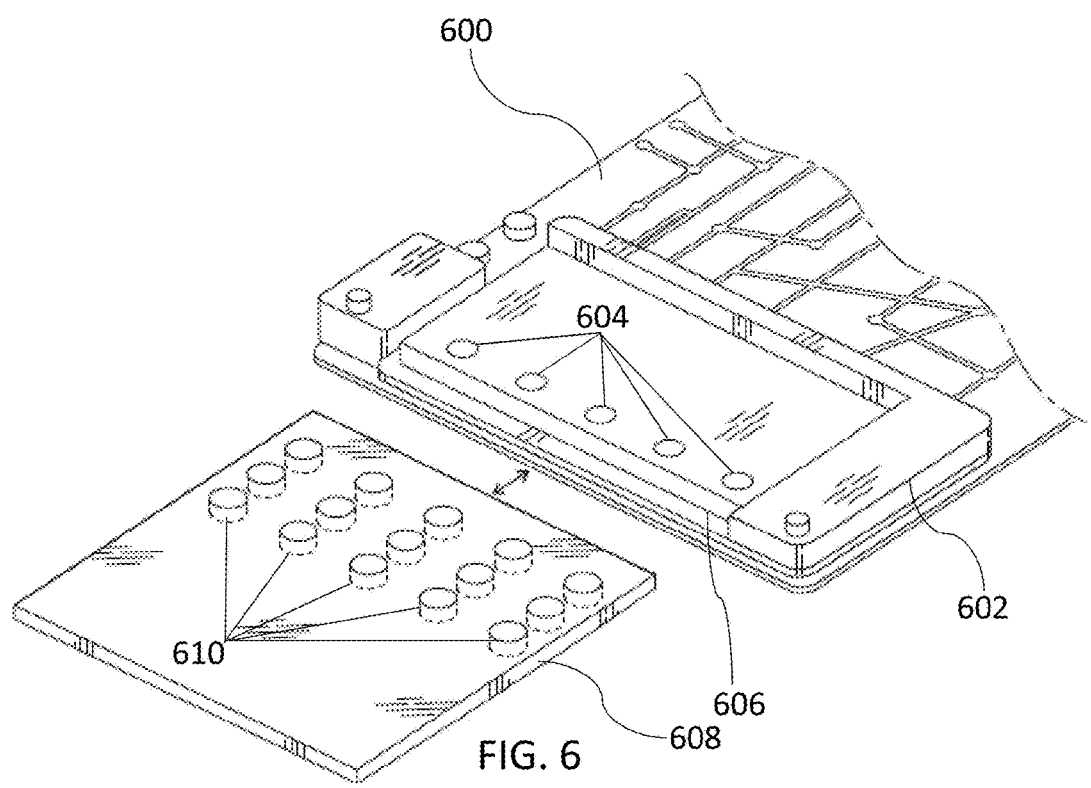
FIG. 6 is an illustration of a magnetically controlled driver magnet component comprising a plurality of driver magnets, and a magnetically controlled valve device comprising a plurality of actuating magnets, wherein the valve device is coupled to a fluid management device.
Figure 7:
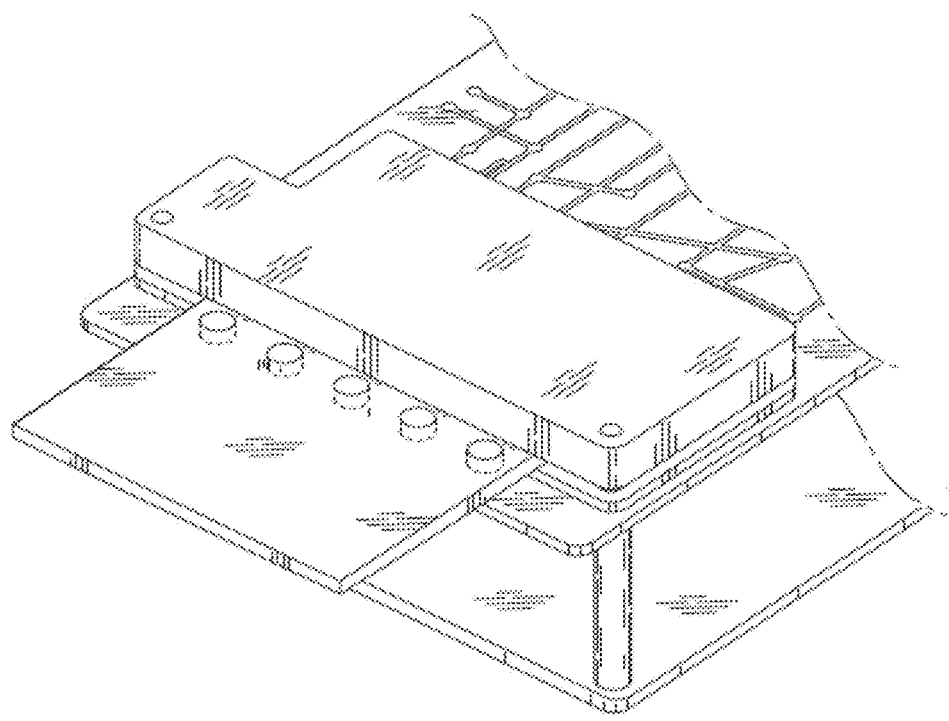
FIG. 7 is an illustration of an exemplary magnetically controlled valve device coupled to a fluid management device wherein the driver magnet component of FIG. 6 has been inserted into the valve device illustrated in FIG. 6.

An exemplary embodiment of such a magnetically controlled valve device is illustrated in FIG. 6. As illustrated in FIG. 6, a fluid management device 600 can be connected to a magnetically controlled valve device 602, which comprises a plurality of housings 604 for actuating magnets (not illustrated), a flexible membrane (a portion of which is exposed and illustrated solely for illustration purposes as 606), and a valve driver slot (not illustrated). The driver slot is configured to accept a valve driver component 608 that comprises a plurality of driver magnet housings 610 configured in three rows to provide an array of driver magnets. By moving the valve driver component back and forth, the flexible membrane can be manipulated so as to open or close, thereby acting as valves that control flow in and out of the channels of the fluid management device. An exemplary fluid management device coupled to a magnetically controlled valve system is shown in FIG. 7. In particular disclosed embodiments, fluidic channels of the fluid management device pass through an area wherein a flexible membrane valve is positioned and the array of driver magnets is used to control actuating the actuating magnets associated with the flexible membrane. By using the array of driver magnets, different valving logics (or fluid logics) are integrated into the device by using different combinations of driver magnet orientation in a single array. As the array is moved into position in the valve driver slot, a set of fluid logics is executed thereby managing flow through the device.

Figure 8:
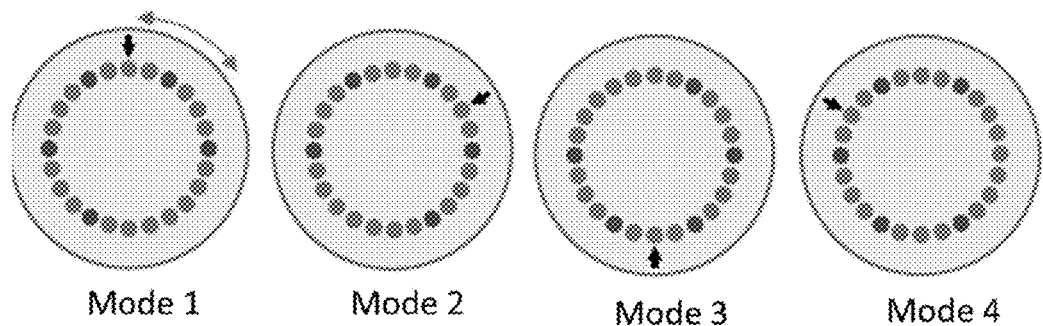
FIG. 8 is a schematic diagram illustrating various different modes that can be used to control fluid flow (also referred to as fluid logic) through fluidic channels using representative magnetically controlled pumps and valves described herein.

The device illustrated in FIG. 6 comprises a linear configuration of driver magnets; however, the present disclosure is not limited to such linear configurations. In some embodiments, the driver magnets can be configured in a circular/continuous pattern, such as that shown in FIG. 8. FIG. 8 shows an exemplary circular configuration of driver magnets, wherein different valve operation modes can be produced by rotating the driver magnets in a circular motion (e.g., see double-headed arrow in FIG. 8, which represents this circular motion). Such driver magnet configurations can be used in combination with the valve devices disclosed herein as well as with pump devices described herein.

The driver magnet component illustrated in the embodiments shown in FIG. 8 includes five driver magnets (shown in as the dark circles) that are orientated so as to have a pole that faces the actuating magnet that is opposite that of the pole of the actuating magnet facing the driver magnet. As such, each of the five driver magnets are able to magnetically attract the actuating magnet when in alignment with the actuating magnet. The driver magnet component also comprises 19 driver magnets that are oriented opposite that of the five driver magnets shown as dark circles; that is, the 19 driver magnets have a pole that faces the actuating magnet and that is the same as that of the pole of the actuating magnet facing the driver magnet. As such, each of the 19 driver magnets is able to magnetically repel the actuating magnets when in alignment with an actuating magnet. As such, the valve remains closed. Table 1 below provides an exemplary sequence of mode operations that correspond to the modes illustrated in FIG. 8.

TABLE 1

Different operation modes of magnetically controlled valves

| Mode (See FIG. 8) | Valve Open | Position of Valve Driver |
|---|---|---|
| 1 | 1 + 2 + 3 | 0° |
| 2 | 1 + 2 | 60° |
| 3 | 2 + 3 | 180° |
| 4 | 1 + 3 | 300° |

B. Pump Embodiments

Figure 9:
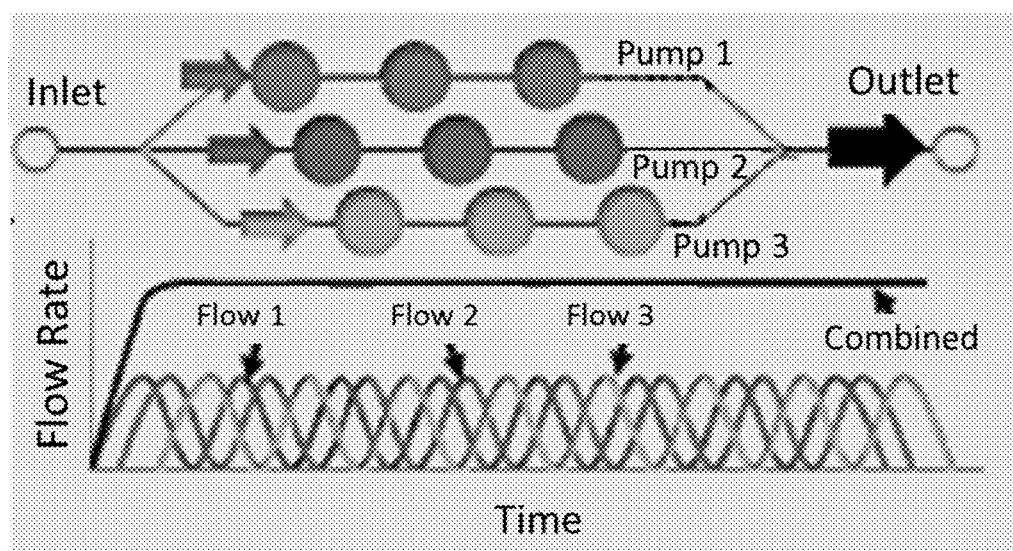
FIG. 9 is a combined schematic diagram and graph illustrating how pulse-free flow can be obtained using embodiments of the actuating magnets described herein to work as pumps; the top portion of FIG. 9 includes a schematic for the flow through channels that can be created using three different actuating magnet sets that act as pumps; and the lower portion of FIG. 9 illustrates how sinusoidal flow from each pump can be combined to provide pulse-free flow.

The concept of magnetic control also can be applied to a plurality of valves to create a pumping mechanism capable of forcing fluid flow through fluidic channels. In some embodiments, driver and actuating magnets are used to create a pumping system capable of creating a vacuum that pulls fluid through fluidic channels or creating peristaltic flow through fluidic channels. In some embodiments, the driver magnets and actuating magnets interact in a manner similar to that described above for valve embodiments; that is, they interact so as to control movement of a flexible membrane component in a synchronized manner such that a pulse-free fluid flow and/or sinusoidal fluid flow can be achieved. An exemplary pump configuration that can be used to obtain pulse-free flow is illustrated in FIG. 9. As shown in FIG. 9, three pumps can be made using three different sets of actuating magnets (labeled as "Pump 1," "Pump 2," and "Pump 3"). In some embodiments, two or more of the magnetically controlled valves described herein can be used in a sinusoidal sequence and thus work as a single pump. By controlling alignment of the actuating magnets with a corresponding set of driver magnets (not illustrated), each pump can be activated to provide three flow rates at different time intervals (labeled as "flow 1," "flow 2," and "flow 3") that result in pulse-free flow (labeled as "combined" in FIG. 9) (see the graph of flow rate as a function of time in FIG. 9).

Figure 10A:
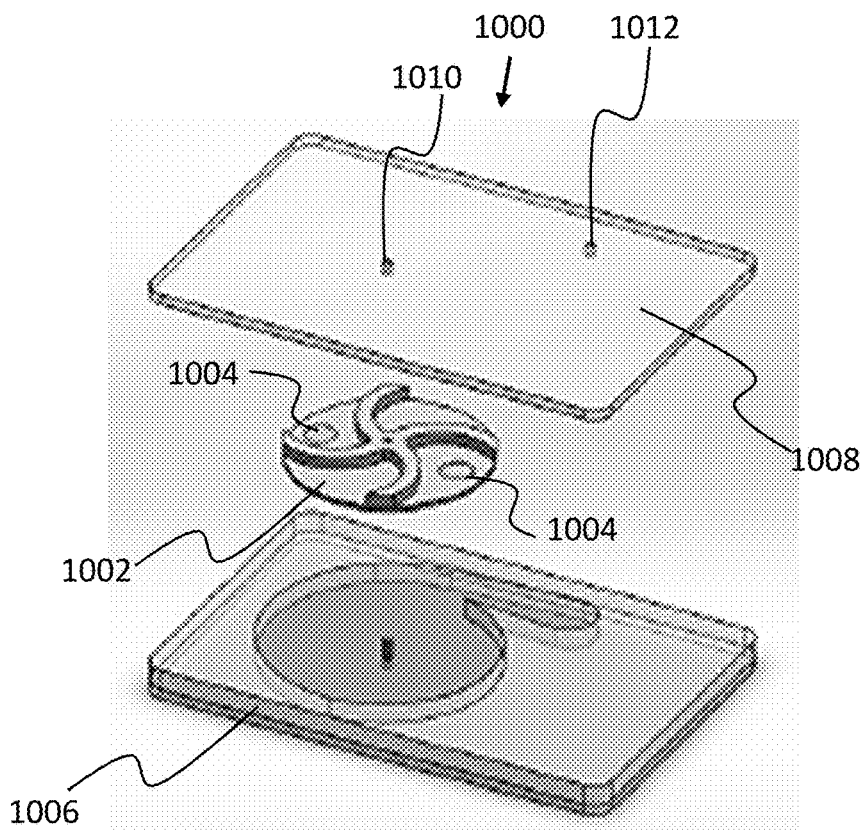
FIGS. 10A and 10B are illustrations of a representative planar centrifugal pump embodiment described herein.
Figure 10B:
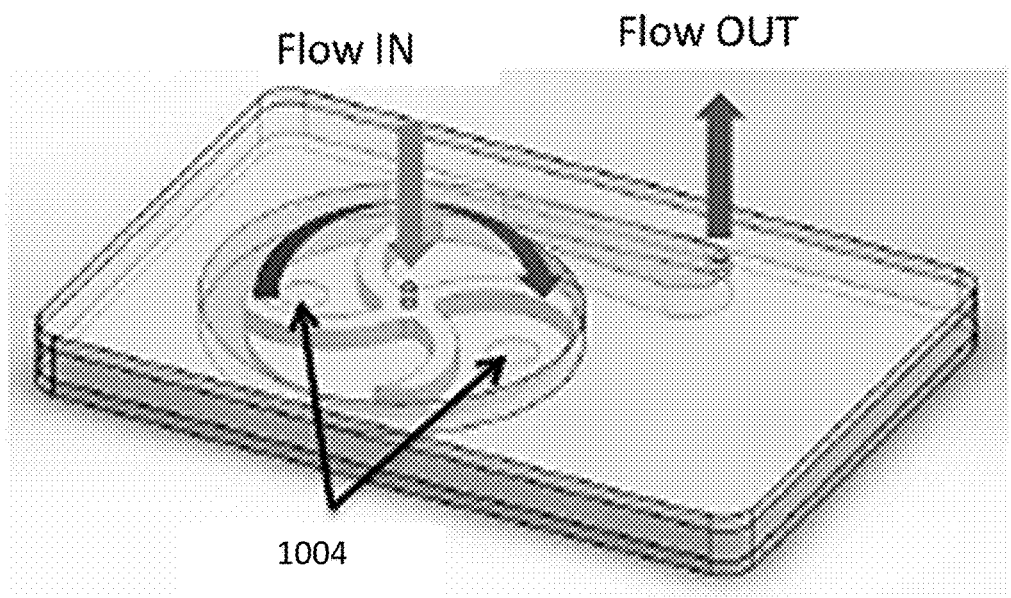
Figure 11:
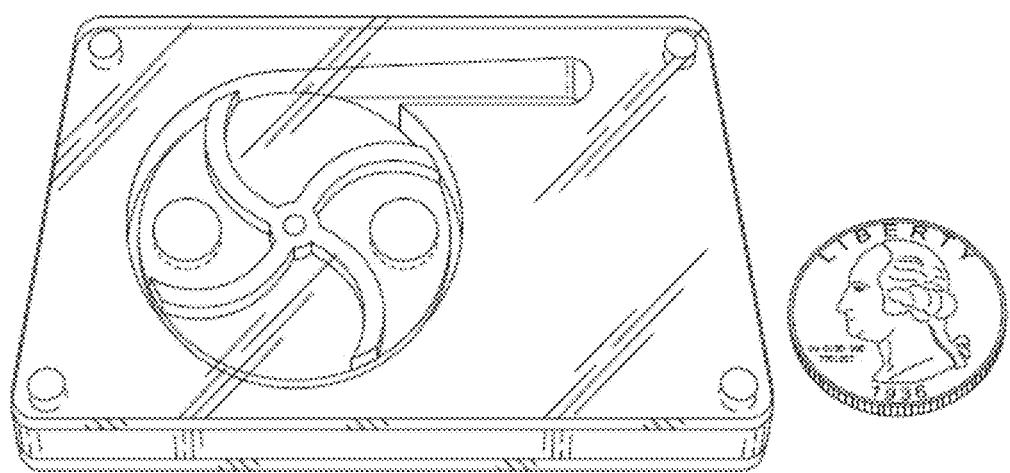
FIG. 11 is an image of a constructed representative planar centrifugal pump embodiment; a U.S. quarter is included for scale.

In additional embodiments, planar centrifugal pumps can be made using magnetic control to produce a pumping mechanism. In such embodiments, fluid can be pumped with closed valves and continuous flow can be achieved. In some embodiments, a centrifugal pump having magnetic control can comprise one or more actuating magnets embedded within a substrate comprising fan-like segments that direct fluid flow in a clockwise or counter-clockwise direction. An exemplary pump device 1000 comprising fan-like segments is illustrated in FIGS. 10A and 10B. As illustrated in FIG. 10A, the fan-like substrate 1002 can comprise one or more magnets 1004 embedded within the fan-like substrate 1002, which is placed within a bottom substrate 1006 and enclosed by a top substrate 1008 comprising a fluid inlet 1010 and outlet 1012. The magnets embedded within the planar centrifugal pump can be driven by external driver magnets or an external magnetic field in a clockwise or counter-clockwise direction, such as is illustrated in FIG. 10B. An exemplary planar centrifugal pump is shown in FIG. 11.

Figure 12A:
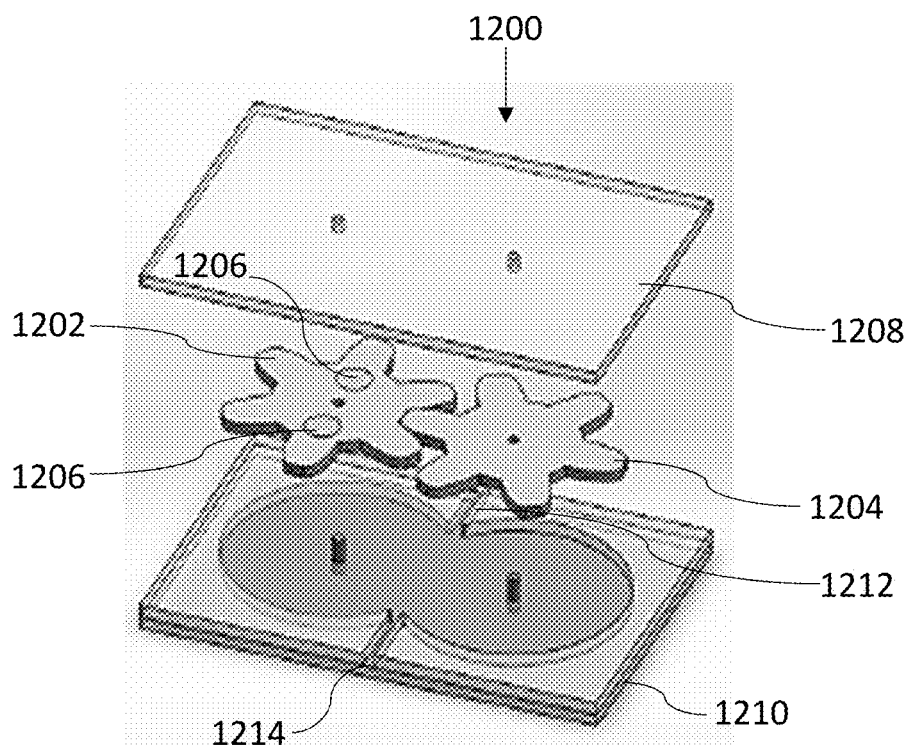
Figure 12B:
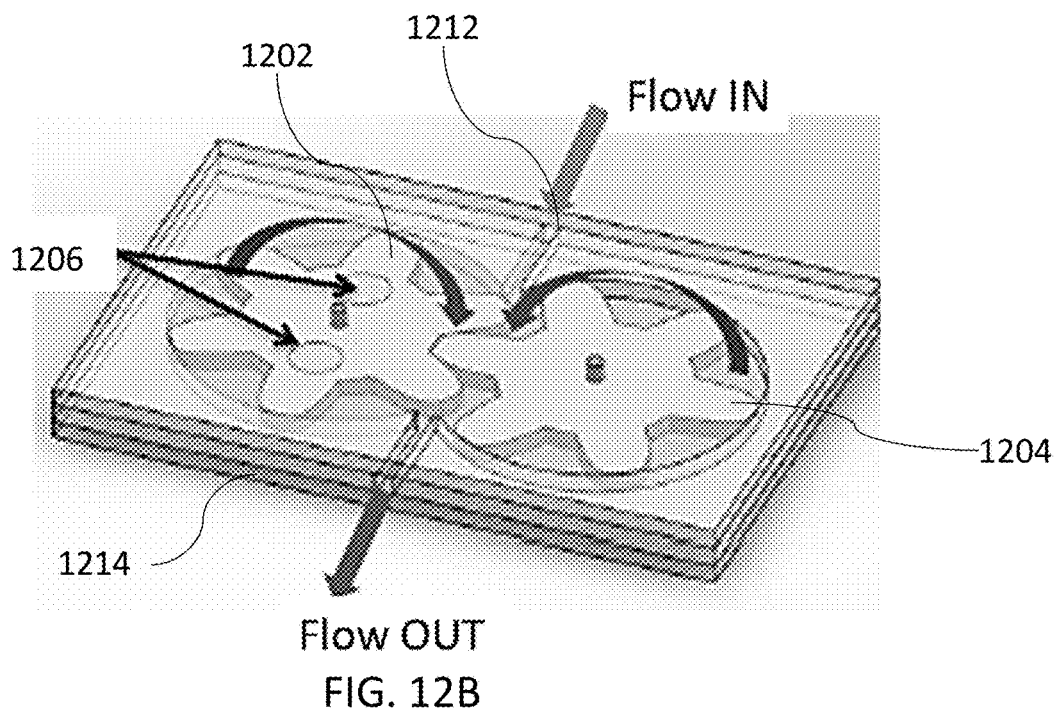
Figure 13:
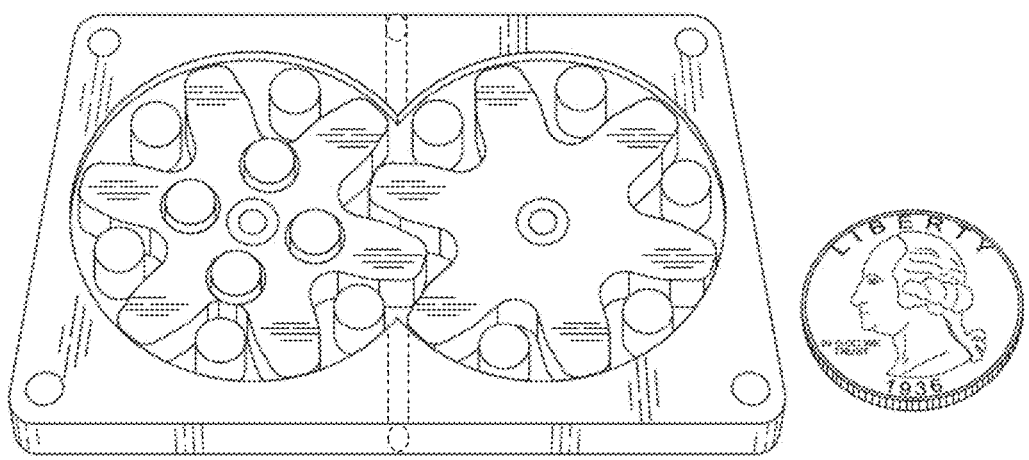
FIG. 13 is an illustration of an exemplary planar rotary gear pump embodiment; a U.S. quarter is included for scale.

In yet additional embodiments, planar rotary gear pumps can be made using the driver/actuating magnet embodiments described herein. Such planar rotary gear pumps can include two gear components, with a first gear component comprising one or more embedded magnets. The gear components can comprise a plurality of cogs. A second gear component is used to facilitate rotation of the gear component comprising the embedded magnets. An exemplary planar rotary gear pump is illustrated in FIGS. 12A, 12B, and 13. As illustrated in FIG. 12A, the planar rotary gear pump 1200 can comprise two gear components 1202 and 1204, with one comprising two (or more) embedded magnets 1206. Substrates 1208 and 1210 cover the gear components 1202 and 1204, with substrate 1210 comprising fluid inlet 1212 and fluid outlet 1214. Fluid flow through the pump can be facilitated by the pulsatile flow created by movements of the two gears, which can be driven by external driver magnets or an external magnetic field (FIG. 12B). The rotary gear pump embodiments are useful for driver high viscosity flow and can provide a constant flow. An exemplary planar rotary gear pump is illustrated in FIG. 13.

In some embodiments of the planar centrifugal and rotary gear pumps, the embedded magnets can be driven by a magnetic stir plate, or any device having a rotating magnetic field. As such, the disclosed embodiments can transform a magnetic stirrer into a pump and/or valve.

Also disclosed herein are embodiments of pumps that can be used for infusion of fluids, referred to herein as infusion pumps. In particular disclosed embodiments, the pump can comprise a magnet substrate, a well-containing substrate (which can further include a fluidic channel), and a flexible membrane component. The magnet substrate can comprise one or more wells configured to house one or more actuating magnets and has a first surface and a second surface. In particular disclosed embodiments, the well of the magnet substrate can further comprise a pressure release port. The well-containing substrate also has a first surface and a second surface and further comprises a well that becomes aligned with the well of the magnet substrate when assembled. The well-containing substrate also can comprise one or more fluidic channels fluidly coupled to the well. In infusion pump embodiments, the well of the well-containing substrate is filled with fluid and thus the well can serve as a fluid reservoir from which fluid is pumped through the one or more fluidic channels fluidly coupled to the well. The flexible membrane component typically is positioned between the magnet substrate and the well-containing substrate. By positioning the flexible membrane layer between the magnet substrate and the well-containing substrate, the one or more actuating magnets that are positioned within the magnet substrate can be used to apply force onto the flexible membrane component such that the flexible membrane extends into the well and pushes fluid out of the reservoir of the well-containing substrate and into the one or more fluidic channels that are fluidly coupled to the reservoir.

In some embodiments, the fluid flow rate through the fluidic channel(s) of the well-containing substrate can be controlled using a particular fluidic channel pattern and/or particular fluidic channel dimensions. For example, for fast flow rates (e.g., 0.1 mL/min to 10 mL/min, such as 0.1 mL/min to 10 mL/min, or 1 mL/min to 5 mL/min) a straight fluid channel can be used and/or the fluidic channel dimension can be configured to be wide and/or deep (e.g., widths of 1 mm and/or heights of 1 mm) such that high volumes of fluid can be pumped through the fluidic channel. To provide slower infusion flow rates, a patterned fluid channel can be provided in the well-containing substrate such that the fluid has to flow through a longer and more complex fluid channel resulting in a slower flow rate (e.g., less than 0.01 mL/min) than would be obtained with a straight fluid channel. The fluidic channel dimensions also can be reduced to decrease the amount of fluid that flows through the fluidic channel (e.g., channel widths of 0.1 mm and heights of 0.1 mm).

In some additional embodiments, the fluid flow rate through the fluidic channel(s) of the well-containing substrate can be controlled by adjusting the magnetic interaction between the driver magnet and the actuating magnet of the magnet substrate. For example, the magnetic interaction between the driver magnet and the actuating magnet can be strengthened to provide a fast fluid flow by increasing the size of the driver magnet thereby promoting a stronger magnetic interaction with the actuating magnet. In some embodiments, the magnetic interaction can be increased by reducing the distance between the driver magnet and the actuating magnet, such as by adjusting the driver magnet's position to be closer to the actuating magnet either by decreasing thickness of one or more of the substrates of the infusion pump (e.g., the magnet substrate, the well-containing substrate, or both) and/or by using the driver magnet component to position the driver magnet closer to the magnet substrate of the infusion pump. In some embodiments, the magnetic interaction between the driver magnet and the actuating magnet can be decreased to reduce fluid flow rates through the infusion pump. In such embodiments, the driver magnet can be reduced in size so that there is less magnetic interaction between it and the actuating magnet. In yet additional embodiments, the distance between the actuating magnet and the driver magnet can be increased. For example, the magnet substrate (or an external substrate coupled to the magnet substrate) of the infusion pump device can be made to have an increased thickness such that there is additional distance introduced between the driver magnet and the actuating magnet. In yet additional embodiments, additional substrates, such as spacer substrates, can be introduced to space the actuating magnet and the driver magnet apart. In yet additional embodiments, the driver magnet component can be used to position the driver magnet at a particular distance away from the magnet substrate of the infusion pump.

An exemplary schematic showing how a representative infusion pump operates is provided by FIGS. 14A and 14B. As illustrated in FIG. 14A, when the infusion pump 1400 is in a resting state (that is, when it is not pumping fluid), the actuating magnet 1402 does not exert force on the flexible membrane component 1404, which is in a resting state and thus any fluid within the pump remains in the reservoir 1406. Once a driver magnet 1408 is positioned near the actuating magnet 1402, it will attract the actuating magnet 1402, which in turn will exert force on flexible membrane component 1404, forcing it to flex into the reservoir 1406 and thus force fluid out of the reservoir (represented by arrow 1410) and into a fluidly-coupled fluidic channel 1412 (FIG. 14B). The device 1400 can further comprise a pressure outlet 1414.

A representative infusion pump embodiment is illustrated in FIG. 15. As illustrated in FIG. 15, a plurality of substrates can be stacked to make up the infusion pump 1500. While a particular ordering of substrates is illustrated in FIG. 15, the embodiments described herein are not limited to this particular ordering. The representative infusion pump embodiment 1500 illustrated in FIG. 15 can comprise two external substrates 1502 and 1504, wherein at least one external substrate (e.g., 1504) is configured to comprise a fluid inlet 1506 and fluid outlet 1508 and further is associated with one or more driver magnets 1510. In some embodiments, external substrate 1504 can be omitted, or it can serve as a spacer substrate, or it can be coupled to one or more additional spacer substrates. In particular disclosed embodiments, driver magnet 1510 can be associated with the external substrate 1504 by providing a driver magnet component (not illustrated) that houses the driver magnet 1510. Embodiments of driver magnet components are discussed below in more detail. Infusion pump 1500 further comprises a magnet substrate 1512 that comprises a well 1514 configured to house one or more actuating magnets, such as pump actuating magnet 1516. Well 1514 and pump actuating magnet 1516 can have any shape, such as circular (as illustrated in FIG. 15), rectangular, square, oval, and the like. A flexible membrane component 1518 also is included in infusion pump 1500 and is positioned between the magnet substrate 1512 and fluidic channel substrate 1520 (which also can be referred to as a well-containing substrate because it comprises well 1522), which is configured to comprise well 1522 that is fluidly coupled to a fluidic channel 1524 and inlet channel 1526. A serpentine-like fluidic channel is illustrated in FIG. 15; however, the fluid channel substrate can be configured to have any desired fluidic channel pattern, including different fluidic channel widths, depths, and lengths.

Figure 16:
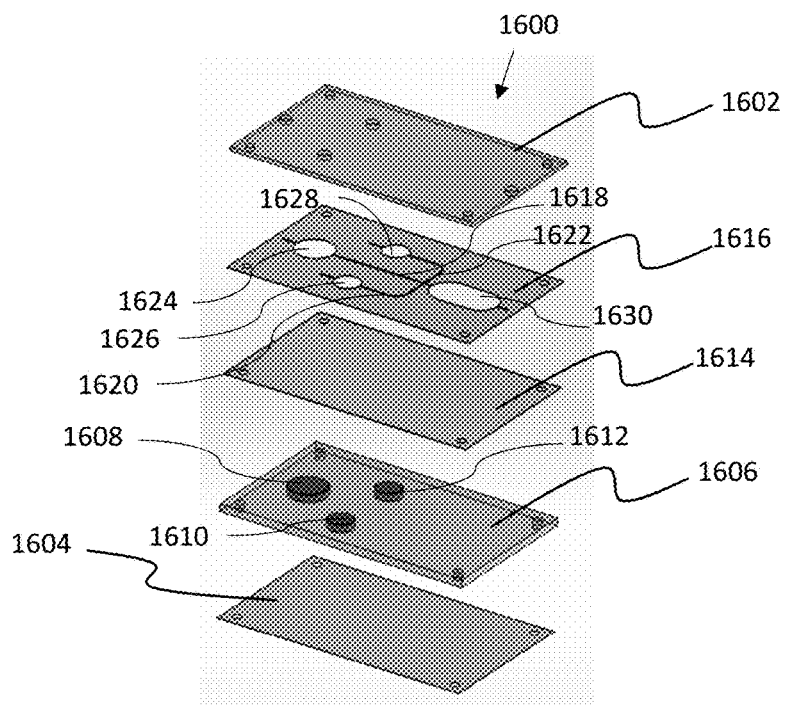
FIG. 16 is an exploded perspective view of another representative infusion pump embodiment comprising a variety of different fluidic channels through which fluid can be pumped and then combined in a collection area.

Another embodiment of an infusion pump comprising a plurality of fluidic channels is illustrated in FIG. 16. As illustrated by FIG. 16, infusion pump 1600 can comprise two external substrates 1602 and 1604. A magnet substrate 1606 can be used that comprises a plurality of actuating magnets 1608, 1610, and 1612, which can be positioned in a desired configuration. In the embodiment illustrated by FIG. 16, the three actuating magnets 1608, 1610, and 1612 have different sizes, but they need not be different sizes. A flexible membrane component 1614 is provided between the magnet substrate 1606 and fluid channel substrate 1616. The fluid channel substrate 1616 can comprise multiple different fluidic channels 1618, 1620, and 1622, which are further fluidly coupled to fluid reservoirs 1624, 1626, and 1628, respectively from which fluid can be pumped to a collection area 1630. The particular infusion pump illustrated in FIG. 16 can be used to mix different media from the fluid reservoirs 1624, 1626, and 1628, such that the different media combine in collection area 1630. In some embodiments, aqueous samples and non-aqueous samples can be combined using infusion pump 1600 and thereby provide droplets of the media. Solely by way of example, water can be combined with an oil to form oil droplets.

Figure 17:
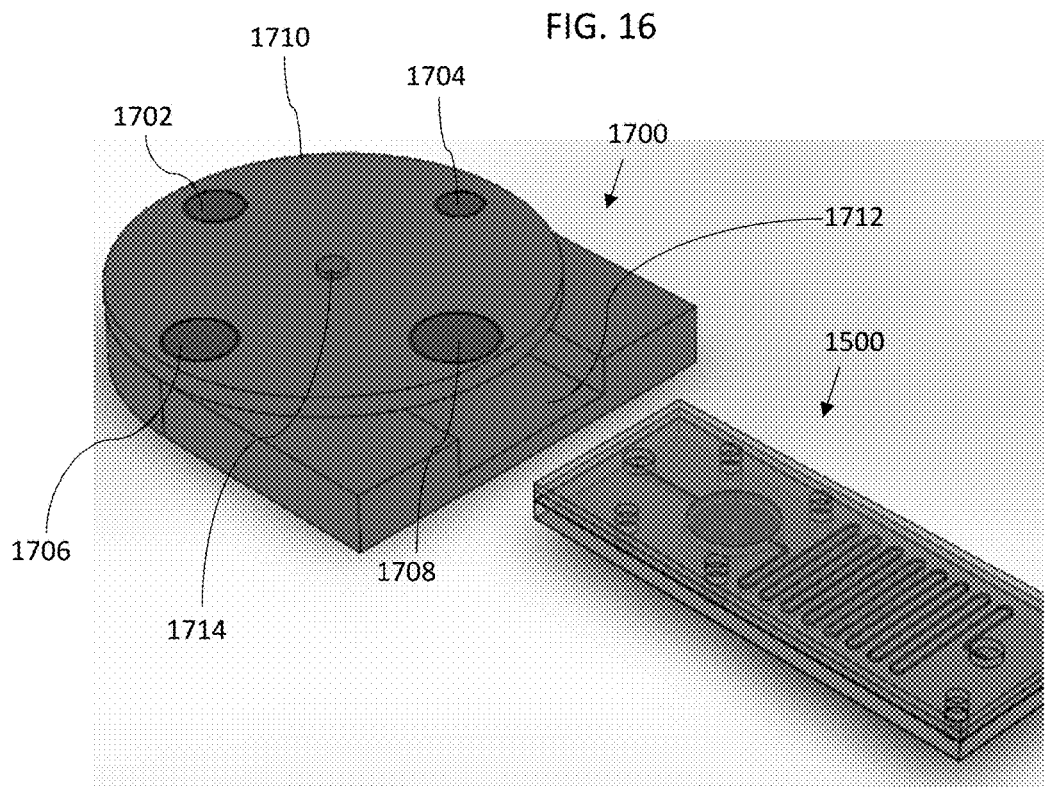
FIG. 17 is an illustration of a representative driver magnet component that can be used with the various different pump and valve devices disclosed herein; the particular embodiment illustrated in FIG. 17 is configured for use with the infusion pump device illustrated in FIG. 15.

A representative driver magnet component 1700 that can be used with an infusion pump device 1500 (and even with other pump and/or valve devices disclosed herein) is illustrated in FIG. 17. As illustrated by FIG. 17, the driver magnet component 1700 can comprise one or more driver magnets 1702, 1704, 1706, and 1708 that can have the same or different sizes. The circular platform 1710 illustrated in FIG. 17 comprises wells that house four different driver magnets 1702, 1704, 1706, and 1708. The driver magnet component further comprises an opening 1712 into which the infusion pump device (e.g., pump 1500) can be placed so as to vertically align an actuating magnet (e.g., magnets 1516) with at least one of driver magnets 1702, 1704, 1706, and 1708. By rotating the circular platform 1710, the driver magnets 1702, 1704, 1706, and 1708 can be used to control the actuating magnet (such as actuating magnet 1516 illustrated in FIG. 15) to thereby pump fluid from a reservoir into a fluidic channel (e.g., fluidic channel 1524 illustrated in FIG. 15). The driver magnet component 1700 also can further comprise an inlet 1714 that becomes vertically aligned with an inlet of the infusion pump device (such as inlet 1506, as illustrated in FIG. 15). Fluid held within a reservoir can be introduced through these inlets and thus the reservoir can be refilled after fluid is pumped out of the reservoir.

Figure 18:
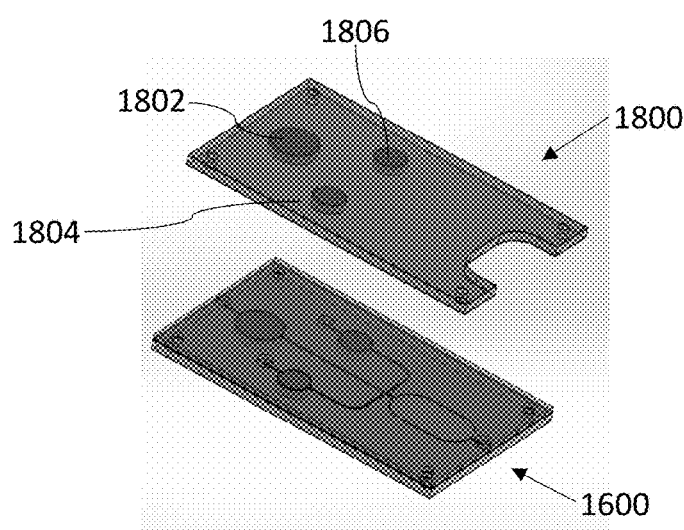
FIG. 18 is an illustration of another representative driver magnet component that can be used with the various different pump and valve devices disclosed herein; the particular embodiment illustrated in FIG. 18 is configured for use with the infusion pump device illustrated in FIG. 16.

Another exemplary driver magnet component is illustrated in FIG. 18. This driver magnet component 1800 can be used with any of the valve and/or pump devices described herein by simply modifying the configuration of wells used to house the driver magnets. In certain embodiments, driver magnet component 1800 can be used in combination with the representative infusion pump 1600 illustrated in FIG. 16. In the embodiment illustrated in FIG. 18, the driver magnet component 1800 comprises a substrate unit comprising a plurality of driver magnets 1802, 1804, and 1806 positioned in a configuration that matches that of the actuating magnets of infusion pump 1600. The driver magnet component 1800 can then be brought into and out of contact with the external substrate of infusion pump (e.g., pump 1600) either manually or in an automated manner so as to promote movement of the actuating magnets (e.g., magnets 1608, 1610, and 1612) to thereby activate the flexible membrane component such that fluids are pumped out of the fluid reservoirs into fluidic channels (e.g., channels 1618, 1620, and 1622).

Figure 19A:
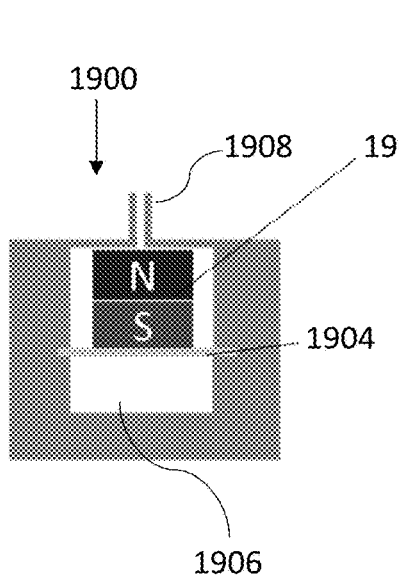
FIGS. 19A and 19B are schematic illustrations showing the operation of a representative vacuum pump.
Figure 19B:
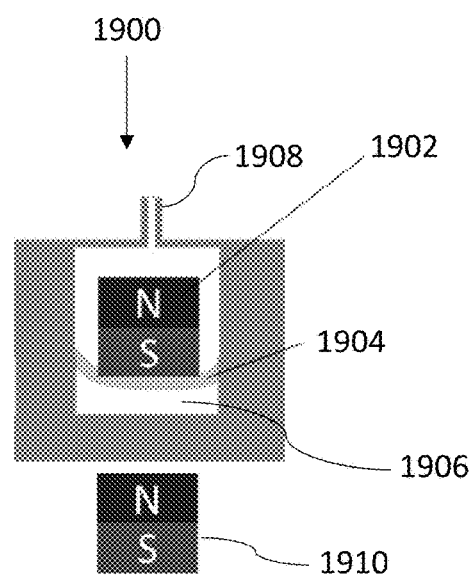

Also described herein are embodiments of pumps that can be used as vacuum pumps. Vacuum pump embodiments can comprise a magnet substrate, a well-containing substrate, and flexible membrane component. In such embodiments, one or more actuating magnets housed in one or more wells of the magnet substrate can interact with the flexible membrane component to provide a vacuum (or suction). In such embodiments, the actuating magnet can be actuated with a driver magnet to apply force to the flexible membrane such that a change in pressure occurs and a vacuum is created. For example, as illustrated schematically in FIG. 19A, a vacuum pump 1900 can comprise an actuating magnet 1902 that is positioned adjacent to a flexible membrane 1904. A void space 1906 is provided below the flexible membrane 1904. In a resting state (that is, when there is no vacuum), the actuating magnet is positioned to close a vacuum opening (or channel) 1908, but when driver magnet 1910 is brought into proximity of the actuating magnet (FIG. 19B), the actuating magnet 1902 will be attracted to the driver magnet 1910 thereby exerting force on the flexible membrane 1904 and exposing vacuum opening (or channel) 1908. By exerting force on flexible membrane 1904, actuating magnet 1902 forces the flexible membrane 1904 into void space 1906 and thus creates a pressure difference, which creates a vacuum. In some embodiments, a vacuum pump chip can comprise a plurality of substrates that are configured to provide the actuating magnet and flexible membrane components. For example, an external substrate can be used as a base substrate that can be associated with one or more driver magnets (such as by using a driver magnet component). An additional substrate comprising an opening serving as the void space 1908 illustrated in FIGS. 19A and 19B can be used and this substrate can be positioned adjacent to a surface of a flexible membrane component. The other surface of the flexible membrane component can be associated with a surface of a magnet substrate that houses an actuating magnet. Another external substrate comprising a vacuum opening can then be associated with the surface of the magnet substrate opposite that of the surface associated with the flexible membrane component, wherein the well housing the actuating magnet is open to the vacuum opening.

C. Combined Valve/Pump Embodiments

Figure 20:
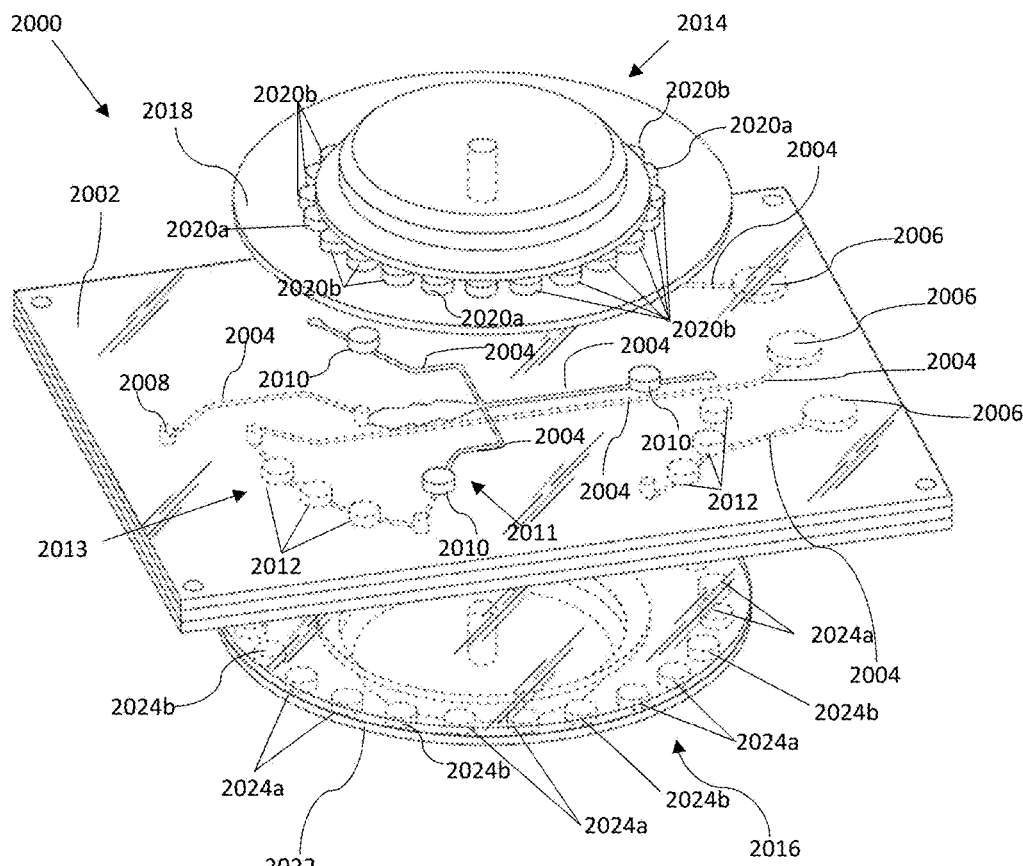
FIG. 20 is an illustration of a representative integrated pump and valve device comprising a combination of magnetically controlled valves, pumps, and magnet driver components.

The magnetically controlled pumps and valves described herein can be combined in a single device. An exemplary embodiment is illustrated in FIG. 20. FIG. 20 is an exploded perspective view of an integrated device embodiment 2000 comprising a fluidic chip 2002, comprising a combination of substrates that when configured together provide a pump component (e.g., component 2013 of FIG. 20) and a valve component (e.g., component 2011 of FIG. 20). The fluidic chip comprises fluidic channels 2004 and corresponding reservoirs 2006 and an outlet 2008. The fluidic chip 2002 is modified to include a plurality of housings 2010 for valve actuating magnets that serve to actuate flexible membrane-based valves within the fluidic platform and thus provide a valve component 2011. The fluidic chip 2002 also can include a plurality of housings 2012 for pump actuating magnets that can act as pumps within the device. The integrated device 2000 further comprises two rotary components: a valve driver component 2014 and a pump driver component 2016. In some embodiments, a motor is used to rotate the valve driver component 2014 and the pump driver component 2016. In some embodiments, the same or different motor(s) can be used to rotate each of the valve driver 2014 and pump driver components 2016. The valve driver component 2014 comprises a substrate 2018 comprising a plurality of embedded driver magnets 2020*a* and 2020*b* that are arranged in a pre-determined configuration. The pump driver component 2014 also comprises a substrate 2022 comprising a plurality of embedded driver magnets 2024*a* and 2024*b* arranged in a pre-determined configuration. The substrates 2018 and 2022 for the valve and pump driver components 2014 and 2016, respectively, can be any suitable shape, such as circular, oval, rectangular, or other shape. The embodiment illustrated in FIG. 20 comprises two circular-shaped substrates, wherein the driver magnets of each substrate are arranged in a circular configuration.

Figure 22:
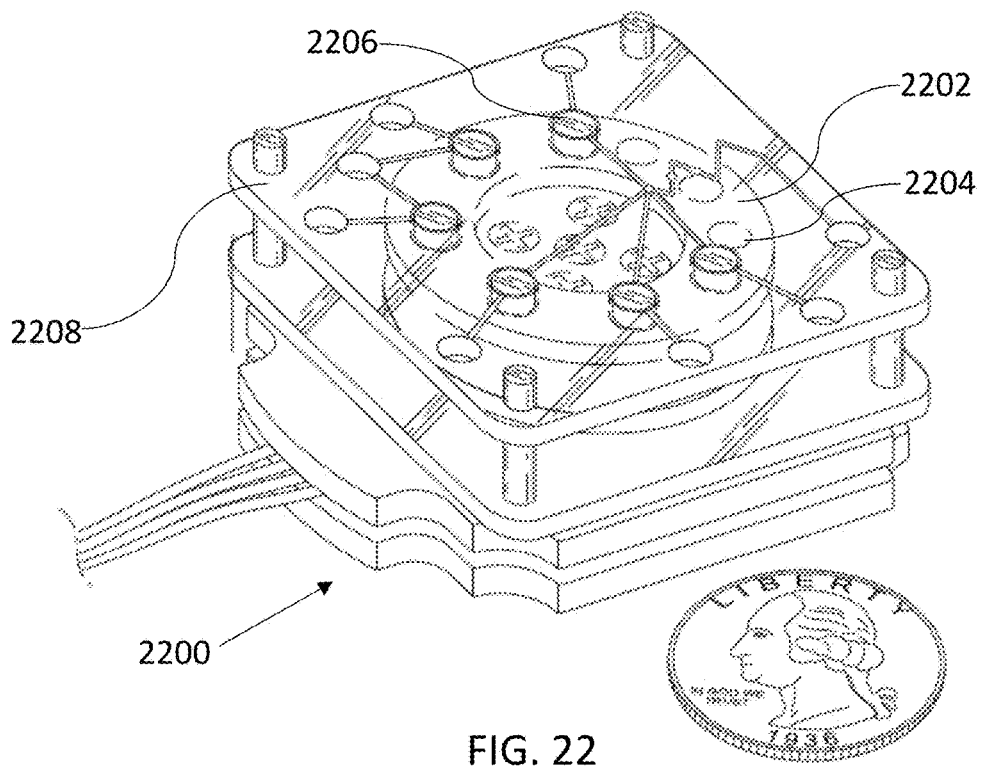
FIG. 22 is an illustration of a representative integrated device described herein comprising a fluidic chip with actuating magnets and a driver magnet component comprising driver magnets that interact with the actuating magnets upon rotation of the driver magnet component.

As illustrated in FIG. 20, the driver magnets are configured so that certain driver magnets have an orientation opposite that of other driver magnets embedded within the fluidic chip. For example, and with reference to FIG. 20, driver magnets 2020*b* and 2024*b* of the valve and pump driver components, respectively, represent driver magnets that are positioned so that, when aligned with an actuating magnet, the driver magnet will be magnetically attracted to the corresponding actuating magnet; driver magnets 2020*a* and 2020*b* of the valve and pump driver components, respectively, represent driver magnets that are positioned so that, when aligned with an actuating magnet, the driver magnet will magnetically repel the corresponding actuating magnet. In some embodiments, the pump driver can be rotated continuously to enable pumping and the valve driver is only rotated into different positions to actuate different valves, which enables the implementation of different liquid logics (or fluid flow modes), such as those shown in FIG. 21. Another exemplary embodiment of an integrated device is illustrated in FIG. 22. Integrated device 2200 of FIG. 22 comprises a single driver magnet component 2202, which houses driver magnets 2204 that can be rotated in a circular motion to thereby magnetically repel or attract actuating magnets 2206 present in fluidic chip 2208.

In some embodiments, the embodiments described herein can be used to magnetically control multiple valves and pumps using a single driver. Magnetic control also can be automated with motors for battery operated applications, or can be performed manually (e.g., by manually moving driver magnet components and/or hand cranking rotary or centrifugal pumps) for power input-free operations.

Figure 23:
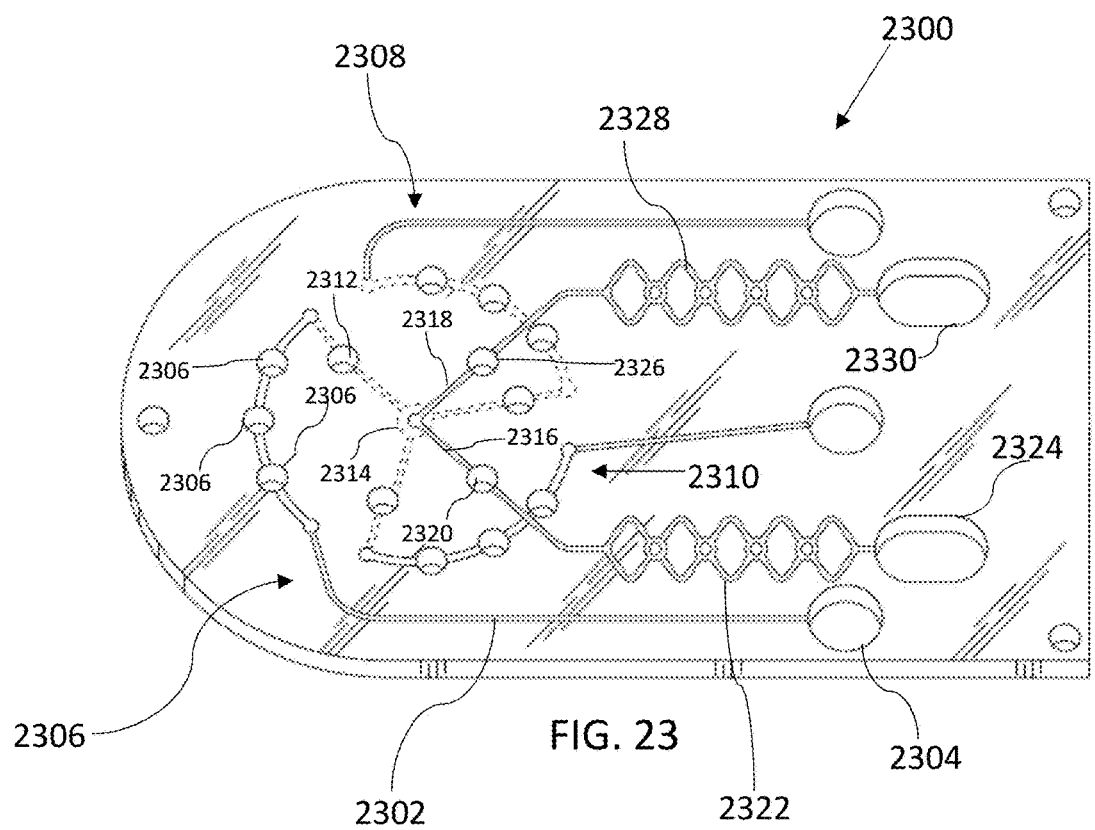
FIG. 23 is an illustration of a representative fluidic chip that can be coupled with actuating magnets and driver magnet components to mix different fluids through the different fluidic systems fabricated into the fluidic chip.

A representative fluidic chip that can be used to implement fluid logics is illustrated in FIG. 23. Fluidic chip 2300 comprises a plurality of fluidic channels 2302, reservoirs 2304, and actuating magnet housings 2304 in which actuating magnets (not illustrated) can be placed. A combination of a fluidic channel, a reservoir, and actuating magnet housings provides a fluid system, such as fluid systems 2306, 2308, and 2310 of fluidic chip 2300 (for simplicity, only one fluid system, i.e., fluid system 2306 is labeled with reference numbers for the fluid channels, reservoirs, and actuating magnet housings). In some embodiments, a first fluid can be provided by reservoir 2304, which is fluidly coupled to fluidic channel 2302. Fluidic channel 2302 is fluidly coupled to three actuating magnet housings 2306 that can be used to house three actuating magnets (not illustrated) that serve as pumps. These actuating magnet housings 2306 are fluidly coupled to another housing 2312 that can accept an actuating magnet (not illustrated) that serves as a valve. The valve can control fluid flow into reservoir 2314. Reservoir 2314 is in turn fluidly coupled to different fluidic channels 2316 and 2318, wherein one fluidic channel 2316 directs from reservoir 2314 using another actuating magnet serving as a valve (which would be positioned in housing 2320) into mixing channels 2322 and then finally to reservoir 2324. The other fluidic channel 2318 is fluidly coupled to a different actuating valve housing 2326, which in turn is fluidly coupled to mixing channels 2328 and reservoir 2330. The embodiment illustrated in FIG. 23 shows three of these types of fluid systems, thereby providing the ability to mix three different fluids. The present disclosure, however, is not limited to examples whereby only three such fluid systems are combined, but could include any number of fluid systems. The embodiment illustrated in FIG. 23 can be used to provide controlled mixing of various different fluids and thus can be useful for DNA sequencing.

In yet additional embodiments, different components could be integrated in the device shown in FIG. 23 (or any modified device having a different configuration of fluidic channels, reservoirs, and/or actuating magnet housings). Solely by way of example, a purification zone (e.g., an area that can be filled with a capture material capable of capturing analytes, such as a silica bead-based material, silica gel, or other such materials) can be integrated with the fluid circuit board. In such embodiments, one of the fluid systems illustrated in FIG. 23 could be used to introduce an analyte-containing solution (e.g., a DNA-containing sample), which could be passed over the purification component using the combined pump/valve system of the fluid system. The analyte would adhere to the capture material and then a wash solution could be introduced using a different fluid system so as to wash away any components not adhered to the absorbant material. An elution fluid could then be introduced by way of another fluid system and pass over the purification component so as to elute any desired analytes from the capture material whereby the analytes are directed to a desired reservoir by using the pump and valve actuating magnets coupled with the device.

III. Methods of Use

The magnetically controlled valves and pumps described herein can be used for a variety of different applications. In some embodiments, magnetically controlled valves and pumps described herein are used to make portable systems for use in microfluidic processes.

In some embodiments, the magnetically controlled valves and pumps described herein can be used to control fluid circuit boards used for controlling fluid flow in a variety of systems. In particular disclosed embodiments, the magnetically controlled valves described herein can be used to replace valving systems used to fluidly couple reactors (e.g., bioreactors). For example, WO 2016/049365 describes valve systems, such as arch valves, that can be used to modify connections and/or control flow into the channel networks of fluid management devices. The presently disclosed magnetically controlled valves can be used in place of these arch valve systems. For example, in some embodiments, the flexible membrane can replace the off-plane arch valves such that the flexible membrane, in combination with suitably configured actuating and driver magnets, can be positioned near inlets and/or outlets of the fluid management device. These inlets and outlets are fluidly coupled to the channels of an integrated channel network of the fluid management device, which in turn can be fluidly coupled to one or more reactors (such as bioreactors like a lung bio-assessment device, a heart bio-assessment device, a liver bio-assessment device, or the like). Magnetically controlled pumps also can be used to facilitate fluid flow through the fluid management device and even through each reactor fluidly coupled thereto. In some embodiments, a magnetically controlled pump system can be used to replace external pumps used to deliver fluid from a reservoir to a fluid management device and/or one or more reactors. Magnetically controlled pump systems also can be integrated within a reactor if used without a fluid management device. Solely by way of example, the magnetically controlled pumps described herein can be used to replace the peristaltic pumps described for use with the integrated devices described in WO 2016/049365.

In some embodiments, the magnetically controlled valves and pumps described herein can be used to make a variety of medical diagnostic tools, such as microfluidic devices (handheld and/or wearable). They also can be used in flow chemistry and nuclear forensics. In some embodiments, the valves and pumps described herein can be incorporated into devices used for biological and/or chemical processing (e.g., DNA sequencing, isolation chemistry, chemical synthesis, biological sample preparation, and the like).

In additional embodiments, the combined magnetically controlled valves and pumps described herein can be used to integrate fluid-based operations, execute infusion or withdrawal (or a combination thereof) from multiple pumps, obtain non-pulsative flow from peristaltic pumps, and execute practical and complex fluid logics using only one driver magnet source for multiple actuating valves and pumps. Because of the unique combination of the driving and actuating components described herein, the above-mentioned conditions can be obtained by only manipulating the pattern and orientation of the driver magnets, without the need to add more motors, which are required with conventional valve/pump operations.

IV. Examples

Representative examples of magnetically controlled valve devices are shown in FIGS. 2, 3, 6, and 7. Representative examples of magnetically controlled pump devices are shown in FIGS. 10A, 10B, 11, 12A, 12B, and 13. A representative example of a combined magnetically controlled valve and pump set-up is shown in FIGS. 20 and 22.

In some embodiments (e.g., device 2300 of FIG. 23), two discs containing a layout of the imbedded driver magnets are placed on both sides of a multi-layered fluidic component unit. The fluidic component unit contains a micro-channel network, membranes, and actuating magnets. The pump driving components are rotated continuously and the valve driving components are rotated according to pre-programmed logic using flat motors (e.g. pancake motors). The pump and valve driving components are interchangeable to implement different liquid logics. In some embodiments, the back flow pressure rating of valves can be evaluated (that is, the pressure at which the valves exhibit a back flow); (2) flow rate ranges for pumps can be evaluated; and (3) maximum head pressure of pumps can be evaluated (that is, the pressure against which the pump can maintain steady operation of pumps). These parameters can be evaluated as functions of the driver rotation (rpm), size of the actuation magnets, and the materials properties of membranes. Data is collected using flow and pressure sensors. In some embodiments, processing of three liquids in every possible combination can be used to demonstrate the ability to integrate any combination of liquid logics. In some embodiments, pumps can be driven either in an infusion or in a withdraw mode. Simultaneous operation of both in two or more parallel pumps can be achieved by inversing the pump magnet orientation and using the same directional rotation of the drivers. Automated 'serial dilution'—a task which involves addition and withdrawal of liquids from a vial—can also be evaluated using embodiments described herein.

In some embodiments, the addition of three sinusoidal waves with a phase offset of ($\pi/3$) results into a no pulse function; thus, three parallel pumps placed at an offset can be used to obtain non-pulsatile flow. Two or three of these non-pulsatile pump assemblies can then be used to make fluidic droplet generators. To obtain uniform droplet sizes, non-pulsatile flow is needed. As such, the disclosed device embodiments and components can be used to make one of the first hand-held MF droplet generators, which can enable point of care (POC) applications of potentially powerful diagnostic methods like digital-PCR (Polymerase Chain Reactions) and direct detection of bacteria from unprocessed blood. In some embodiments, the implementation of commercially available PureLink® Genomic DNA Kits, which uses solid phase extraction of DNA from whole blood, can be used. The kit four steps: lyse, bind, wash, and elute. The fluidic unit can integrate silica beads for the solid phase extraction.

V. Overview of Additional Embodiments

Disclosed herein are embodiments of a device, comprising one or more valve actuating magnets; one or more valve driver magnets; a first substrate comprising one or more depressions (or wells) configured to house the one or more valve actuating magnets; a flexible membrane; a second substrate comprising one or more fluidic channels; a third substrate comprising one or more wells configured to house the one or more valve driver magnets; and wherein the flexible membrane is positioned between the first substrate and the second substrate and the third substrate is positioned above the first substrate and the second substrate. In some embodiments, the second substrate comprises one or more discontinuous fluidic channels. In any or all of the above embodiments, the device further comprises an opening into which the third substrate comprising the one or more driver magnets can be inserted so as to align the one or more driver magnets with the one or more actuating magnets. In any or all of the above embodiments, the wells of the third substrate are configured to provide a linear or circular array of the one or more valve driver magnets. In some embodiments, the linear or circular array of the one or more valve driver magnets includes a pattern of the one or more valve driver magnets that is used to selectively actuate the one or more valve actuating magnets. In any or all of the above embodiments, the device can further comprise two or more pump actuating magnets and two or more pump driver magnets. In such embodiments, the device can also further comprise a fourth substrate comprising two or more wells configured to house the two or more pump actuating magnets and a fifth substrate comprising two or more wells configured to house the two or more pump driver magnets. In any or all of the above embodiments, the device can further comprise one or more motors capable of rotating the third substrate and the fifth substrate. In some embodiments, the two or more pump actuating magnets are arranged in a series. In some embodiments, the two or more pump driver magnets are used to actuate the two or more pump actuating magnets in an alternating mode. In yet additional embodiments, the wells of the fifth substrate are configured to provide a linear or circular array of the two or more pump driver magnets. In such embodiments, the linear or circular array of the two or more pump driver magnets includes a pattern of the two or more pump driver magnets that is used to selectively actuate the two or more pump actuating magnets.

Also disclosed herein are embodiments of a peristaltic pump, comprising two or more pump actuating magnets arranged in series; two or more pump driver magnets; a first substrate comprising two or more wells configured to house the two or more pump actuating magnets; a flexible membrane; a second substrate comprising one or more fluidic channels; a third substrate comprising two or more wells configured to house the two or more pump driver magnets; and wherein the flexible membrane is positioned between the first substrate and the second substrate and the third substrate is positioned above the first substrate and the second substrate. In some embodiments, the device can further comprise one or more additional linear series of two or more pump actuating magnets. In such embodiments, the two or more pump driver magnets are used to actuate the two or more pump actuating magnets in an alternating mode.

Also disclosed herein are embodiments of a planar centrifugal pump, comprising one or more actuating magnets; a circular substrate comprising one or more wells configured to house the one or more actuating magnets; a first substrate comprising a well configured to accept the circular substrate; and a second substrate comprising one or more inlets and outlets. In some embodiments, the one or more actuating magnets are exposed to one or more driver magnets or a magnetic field so as to cause clockwise or counter-clockwise rotation of the circular substrate.

In yet other embodiments, a planar rotary gear pump is disclosed, which comprises one or more actuating magnets; a first gear component comprising at least one cog and one or more wells configured to house the one or more actuating magnets; a second gear component comprising at least one cog; a first substrate comprising one or more wells configured to accept the first and second gear components; an inlet fluid channel; and an outlet fluid channel; and a second substrate.

Methods of using the devices and components described herein also are disclosed. In some embodiments, embodiments of a method of magnetically-controlling a valve are described and can comprise actuating a flexible membrane to open or close a fluidic channel by exposing an actuating magnet associated with the flexible membrane to a driver magnet that is capable of magnetically attracting the actuating magnet. In some embodiments, embodiments of a method of magnetically-controlling a pump are described and can comprise exposing a device comprising a substrate housing one or more actuating magnets to one or more driver magnets or an external magnetic field.

Also disclosed herein are embodiments of magnetically controlling fluid flow through a fluidic channel, comprising exposing an actuating magnet that is embedded within a first substrate and associated with a flexible membrane to a first driver magnet that is embedded within a second substrate; and flipping or moving the first driver magnet so as to magnetically attract the actuating magnet or exposing the actuating magnet to a second driver magnet that magnetically attracts the actuating magnet, wherein magnetically attracting the actuating magnet facilitates movement of the flexible membrane. In some embodiments, a plurality of actuating magnets and driver magnets are used to pump fluid through the fluidic channel. In any or all of the above embodiments, the movement of the flexible membrane results in blocking or permitting fluid flow through the fluidic channel.

Also disclosed are embodiments of a method, comprising introducing a fluid into the devices described herein; moving the one or more driver magnets in position with the one or more valve actuating magnets; actuating the one or more valve actuating magnets by magnetically attracting or magnetically repelling the one or more valve actuating magnets with the one or more valve driver magnets; and moving the flexible membrane by actuating the one or more valve actuating magnets. In some embodiments, the third substrate is a valve driver component that comprises a plurality of driver magnets positioned in a pattern and the method further comprises moving the valve driver component in a particular direction so as to control actuating the valve actuating magnets in pre-determined modes.

In some embodiments, the devices comprise chip components fabricated to comprise a magnet substrate comprising a well configured to house the actuating magnet and comprising a first surface and a second surface, and a fluid channel substrate with a first surface and a second surface wherein the first surface of the fluid channel is coupled directly or indirectly to the first surface of the magnet substrate, wherein the fluid channel substrate comprises a fluidic channel, a well fluidly coupled to the fluidic channel, or a combination thereof. The chips can be modified with one or more actuating magnets to provide a valve device and/or a pump device. In some embodiments, the chips further comprise a flexible membrane component positioned between the first surface of the magnet substrate and the first surface of the fluid channel substrate. In some embodiments, the devices disclosed herein comprise a plurality of actuating magnets housed in a plurality of wells fabricated in the magnet substrate. In yet additional embodiments, the device can comprise one or more spacer substrates coupled to the second surface of the fluid channel substrate or coupled to the second surface of the magnet substrate. In some embodiments, the fluidic channel is a discontinuous fluidic channel, which can comprise an elevation configured to block fluid flow through the fluidic channel. A plurality of magnet substrates wherein each magnet substrate comprises a valve actuating magnet, a pump actuating magnet, or a combination thereof can be used. In some embodiments, the magnet substrate comprises a plurality of wells configured in a linear or circular array and each well comprises an actuating magnet. In yet additional embodiments, the fluidic channel of the fluid channel substrate can be fluidly coupled to a fluid reservoir formed in the fluid channel substrate and/or can comprises a plurality of fluidic channels that are fluidly coupled to one or more fluid reservoirs.

The devices disclosed herein can further comprise a driver magnet component positioned adjacent to the second surface of the magnet substrate, adjacent to the second surface of the fluid substrate, or both, and wherein the driver component comprises a driver magnet. In some embodiments, the driver component comprises a plurality of driver magnets configured in a linear or circular array designed to selectively actuate the actuating magnet. The plurality of driver magnets can include a combination of driver magnets selected to magnetically attract the actuating magnet and driver magnets selected to magnetically repel the actuating magnet.

In some exemplary pump device embodiments, the pump device can comprise a magnet substrate comprising a well configured to house an actuating magnet and comprising a first surface and a second surface; a flexible membrane component comprising a first surface and a second surface, wherein the first surface of the flexible membrane component is positioned adjacent to the first surface of the magnet substrate; and a well-containing substrate with a first surface and a second surface wherein the first surface of the well-containing substrate is coupled to the second surface of the flexible membrane component, the well-containing substrate comprising a well aligned with the well of the magnet substrate. Actuating magnets are housed within the magnet substrate and can be controlled using driver magnets. In some embodiments, the well-containing substrate further comprises a fluidic channel fluidly coupled to the well and an inlet and outlet fluidly coupled to the fluidic channel and the well. In additional embodiments, the pump device can further comprise one or more spacer substrates positioned adjacent to the second surface of the well-containing substrate, a driver component positioned adjacent to the well-containing substrate, and/or a driver component positioned adjacent to the one or more spacer substrates.

In view of the many possible embodiments to which the principles of the present disclosure may be applied, it should be recognized that the illustrated embodiments are only preferred examples of the present disclosure and should not be taken as limiting. Rather, the scope is defined by the following claims. We therefore claim as our invention all that comes within the scope and spirit of these claims.

We claim:

1. A pump device, comprising:
a magnet substrate comprising a well configured to house an actuating magnet and comprising a first surface and a second surface, wherein the actuating magnet is a permanent magnet;
a flexible membrane component comprising a first surface and a second surface, wherein the first surface of the flexible membrane component is positioned adjacent to the first surface of the magnet substrate;
a well-containing substrate with a first surface and a second surface wherein the first surface of the well-containing substrate is coupled to the second surface of the flexible membrane component, the well-containing substrate comprising a well aligned with the well of the magnet substrate; and
a driver magnet component positioned adjacent to the magnet substrate, wherein the driver magnet component comprises a plurality of driver permanent magnets configured in a linear or circular array designed to selectively actuate the actuating magnet.

2. The pump device of claim 1, wherein the well-containing substrate further comprises a fluidic channel fluidly coupled to the well and an inlet and outlet fluidly coupled to the fluidic channel and the well.

3. The pump device of claim 2, further comprising one or more spacer substrates positioned adjacent to the second surface of the well-containing substrate, a driver component positioned adjacent to the well-containing substrate, and/or a driver component positioned adjacent to the one or more spacer substrates.

4. A valve device, comprising:
a magnet substrate comprising a well configured to house an actuating magnet and comprising a first surface and a second surface, wherein the actuating magnet is a permanent magnet;

a barrier layer comprising a first surface and a second surface wherein the first surface of the barrier layer is positioned adjacent to the first surface of the magnet substrate;

a fluid channel substrate with a first surface and a second surface wherein the first surface of the fluid channel substrate is coupled to the second surface of the barrier layer, the fluid channel substrate comprising a discontinuous fluidic channel comprising an elevation configured block fluid flow through the discontinuous fluid channel; and a driver magnet component positioned adjacent to the magnet substrate, wherein the driver magnet component comprises a plurality of driver permanent magnets configured in a linear or circular array designed to selectively actuate the actuating magnet.

5. The valve device of claim 4, wherein the valve device comprises a plurality of actuating magnets housed in a plurality of wells fabricated in the magnet substrate, wherein each actuating magnet of the plurality is a permanent magnet.

6. The valve device of claim 5, wherein the plurality of wells are configured in a linear or circular array.

7. The valve device of claim 4, further comprising one or more spacer substrates coupled to the second surface of the fluid channel substrate or coupled to the second surface of the magnet substrate.

8. The valve device of claim 4, wherein the fluidic channel is a discontinuous fluidic channel.

9. The valve device of claim 8, wherein the discontinuous fluidic channel comprises an elevation configured to block fluid flow through the fluidic channel.

10. The valve device of claim 4, wherein the valve device comprises a plurality of magnet substrates wherein each magnet substrate comprises a valve actuating magnet, wherein the valve actuating magnet is a permanent magnet.

11. The device of claim 4, wherein the fluidic channel of the fluid channel substrate is fluidly coupled to a fluid reservoir formed in the fluid channel substrate.

12. The device of claim 4, wherein the fluid channel substrate comprises a plurality of fluidic channels that are fluidly coupled to one or more fluid reservoirs.

13. An integrated pump and valve device, comprising:

a pump component, comprising (i) a pump magnet substrate comprising a plurality of wells that each house a pump actuating magnet, wherein each pump actuating magnet is a permanent magnet, and comprising a first surface and a second surface; (ii) a flexible membrane component comprising a first surface and a second surface, wherein the first surface of the flexible membrane component is positioned adjacent to the first surface of the pump magnet substrate; (iii) a pump fluid channel substrate comprising a first surface and a second surface, wherein the first surface of the pump fluid channel substrate is coupled to the second surface of the flexible membrane component, and wherein the pump fluid channel substrate comprising a fluidic channel and an outlet;

a valve component, comprising (i) a valve actuating magnet, wherein the valve actuating magnet is a permanent magnet; (ii) a valve magnet substrate comprising a well configured to house the valve actuating magnet and comprising a first surface and a second surface; and (iii) a valve fluid channel substrate with a first surface and a second surface wherein the first surface of the valve fluid channel substrate is coupled directly or indirectly to the first surface of the valve magnet substrate, wherein the valve fluid channel substrate comprises a fluidic channel, a well fluidly coupled to the fluidic channel, or a combination thereof, wherein the valve fluid channel substrate further comprises an inlet; and a first driver magnet component positioned adjacent to the pump component, wherein the first driver magnet component comprises a plurality of driver permanent magnets configured in a linear or circular array designed to selectively actuate each pump actuating magnet; and a second driver magnet component positioned adjacent to the valve component, wherein the second driver magnet component comprises a plurality of driver permanent magnet configured in a linear or circular array designed to selectively actuate the valve actuating magnet of the valve component; wherein the pump component is fluidly coupled to the valve component such that the outlet of the fluid channel substrate of the pump component is aligned with the inlet of the fluid channel substrate of the valve component.

14. A method of magnetically controlling fluid flow through a fluidic channel, comprising using a driver magnet or a driver magnet component comprising a plurality of driver magnets to magnetically attract or magnetically repel the valve actuating magnet and/or the pump actuating magnet of the device of claim 13, wherein each driver magnet is a permanent magnet.

* * * * *